United States Patent [19]

Kawasaki

[11] Patent Number: 4,943,873

[45] Date of Patent: Jul. 24, 1990

[54] ROTARY HEAD TYPE DIGITAL-AUDIO REPRODUCING DEVICE WITH IMPROVED TRACK-DEVIATION DETECTING SYSTEM

[75] Inventor: Ken-ichiro Kawasaki, Saitama, Japan

[73] Assignee: Pioneer Electronic Corporation, Tokyo, Japan

[21] Appl. No.: 98,826

[22] Filed: Sep. 21, 1987

[30] Foreign Application Priority Data

Sep. 20, 1986 [JP] Japan .................... 61-220837

[51] Int. Cl.$^5$ ............................................. G11B 5/584
[52] U.S. Cl. .................................... 360/77.15; 360/32
[58] Field of Search .............. 360/77, 32, 18, 27, 360/19.1, 158, 70, 73, 77.14, 77.15, 77.08, 73.04, 73.09, 73.11

[56] References Cited

U.S. PATENT DOCUMENTS

| | | | |
|---|---|---|---|
| 4,530,012 | 7/1985 | Kinjo | 360/77.15 |
| 4,656,539 | 4/1987 | Sugiki et al. | 360/77 |
| 4,714,971 | 12/1987 | Sigiki et al. | 360/77 |
| 4,739,420 | 4/1988 | Odaka et al. | 360/77 |
| 4,755,893 | 7/1988 | Yamada et al. | 360/77 |

Primary Examiner—Alan Faber
Assistant Examiner—Steven R. Garland
Attorney, Agent, or Firm—Sughrue, Mion, Zinn Macpeak & Seas

[57] ABSTRACT

A rotary head type digital-audio reproducing device is disclosed. This device is arranged such that: digital signals, tracking pilot signals with frequencies producing reduced azimuth effects and SYNC signals are recorded on tracks in a predetermined format; locations of recording patterns of the pilot signals and the SYNC signals are different; the signals are reproduced by at least two rotary heads each having a width larger than that of the track; cross talk of the pilot signals on the ON-track and the pilot signals on the two adjacent tracks is obtained in the output of the rotary head; a capstan servo is controlled by a level difference of cross talk between the pilot signals on the two adjacent tracks; and the rotary head scans on the track. In this arrangement, the device includes pilot signal detecting means for detecting risings of the pilot signals and holding means for sample-holding the cross talk of the pilot signals on one adjacent track in accordance with the recording pattern upon a detection of the pilot signals. The capstan servo is controlled by generating a signal exhibiting a quantity of track-deviation in conformity with a level held by the holding means and a level of cross talk of the pilot signals on the other adjacent track.

23 Claims, 13 Drawing Sheets

ROTARY HEAD TYPE DIGITAL-AUDIO REPRODUCING DEVICE WITH IMPROVED TRACK-DEVIATION DETECTING SYSTEM

BACKGROUND OF THE INVENTION

The present invention relates to a rotary head type digital-audio reproducing device suited to reproduce digital signals which have been converted into PCM signals and recorded on oblique tracks formed one at a time on a tape like recording medium by means of rotary heads.

There has been proposed a rotary head type digital audio recording/reproducing device which is referred to as an R-DAT (Rotary Head Type Digital-Audio Tape Recorder). In such as recording/reproducing device, the audio signals are recorded on a magnetic tape by a helical scan type rotary head while forming the oblique tracks one at a time. In the next step, the audio signals are recorded and reproduced after the audio signals have been converted into PCM signals.

A format of the tracks on which actual recording is effected in the R-DAT assumes the pattern illustrated in FIG 1(a). Each frequency of MARGIN, PLL, POST-AMBLE is $(\frac{1}{3})f_M$ ($f_M = 9.4$ MHz). and the frequency of IBG is $(1/6)f_M$. SUB and PCM are composed of such blocks as illustrated in FIG. 1(b). SYNC is 10 bits (9 bits are fixed). and the rest take a variety of patterns according to their locations and voice signals. The SUB has 8 blocks, and the PCM has 128 blocks. Each numerical value of FIG. 1(a) indicates the number of blocks occupied by the individual regions.

Two regions ATF1 and ATF2 (ATF stands for: Automatic Track Finding are) interposed between the SUB-1 and the PCM and between the PCM and the SUB-2, respectively. These two regions are provided so that tracking control, under which the rotary heads properly scan on the recording tracks at the time of reproduction, can be effected by outputs of the rotary heads, without the use of a special head.

Namely, the ATF regions are regions in which tracking pilot signals are individually recorded. The ATF regions are separate from the recording region for the PCM signals and are provided both at the starting portion of each track (before the PCM region) and at the terminating portion thereof (after the PCM region). When recording the PCM signals on the magnetic tape by use of the rotary heads while forming the oblique tracks thereon, without any guard bands, the tracking pilot signals are recorded after the PCM signals have been time-axis-compressed The pilot signals recorded in the ATF regions are utilized to control the tracking of the rotary heads. Control of the rotary heads is in response to reproduction signals of the pilot signals from two tracks adjacent to respective sides of the track being scanned. The reproduction signals are obtained in the output of each rotary head when reproducing a magnetic tape by scanning the recording track using rotary heads which each have a scanning width larger than the width of the track.

As depicted in FIG. 2, track patterns in the ATF regions are initially determined. Where a drum diameter is 30 mm, a drum winding angle is 90° and the velocity of rotation is 2000 rpm, the illustrated patterns are explained as follows:

The ATFs 1 and 2 disposed at the front and rear portions have signals $f_1$ having low frequencies which will produce fine azimuth effects. The signals $f_1$ are defined as the tracking pilot signals. The ATFs 1 and 2 are utilized for detecting a magnitude of the level of cross talk from the two adjacent tracks at the time of reproduction and for obtaining a level difference as a tracking error signal between cross talk components of the two adjacent tracks. The pilot signal $f_1$ involves a low frequency signal of $f_M/72$ (=130 KHz).

The ATF-1 and ATF-2 regions also contain SYNC signals for determining the positions in which the pilot signals $f_1$ are recorded. If cross talk is present, the ON-track (the track being scanned) will be indistinguishable from the two adjacent tracks. Hence, the SYNC signals eligible for selection have frequencies which produce the azimuth effects and have patterns which do not appear in the PCM signals. If the rotary head corresponding to (+) azimuth is A and the rotary head corresponding to (−) azimuth is B, the SYNC signals are arranged to be different from each other in order to distinguish the A rotary head from the B rotary head. The SYNC 1 signals $f_2$ each having a frequency $f_M/18$ (=522 KHz) with respect to the A head are recorded in a predetermined location, and similarly the SYNC 2 signals $f_3$ each having a frequency $f_M/12$ (=784 KHz) with respect to the B head are recorded in a predetermined location.

No erase head is provided in the R-DAT. When rewriting the signals, an overwrite on the previous record is performed. For this reason, erase signals $f_4$ having a frequency $f_M/6$ (=1.56 MHz) are recorded in predetermined positions suitable for erasing the previously recorded pilot signals $f_1$, SYNC 1 signals $f_2$ and SYNC 2 signals $f_3$.

All the positions of the pilot signals of the ATFs differ from each other on the ON track and the adjacent tracks. The level of the pilot signals on the ON-track is different from that of the pilot signals on the adjacent tracks in terms of time. The pilot signals are allocated to sample each of the three levels.

Five blocks are allotted to each of the regions ATF-1 and ATF-2, and the pilot signals $f_1$ are recorded in two of the five blocks. The SYNC signals $f_2$, $f_3$ are recorded by occupying one block or one-half block extending from the center of the recording location of the tracking pilot signals of one of the adjacent tracks. The pilot signal $f_1$ of the other adjacent track is recorded to locate its center after two blocks from the beginning of the SYNC signal recorded on the ON-track. The SYNC signals of one block are allocated to odd numbered frames, whereas the SYNC signals of one-half block are allocated to even-numbered frames.

As explained above, in the ATF regions, the frequencies of the SYNC signals differ, depending on the A rotary head or the B rotary head, and the recording lengths of the SYNC signals differ, depending on the odd-numbered frames or the even-numbered frames, The four consecutive tracks are distinguishable because all the four tracks are provided with different ATFs. The above described ATF pattern is a 4-track-completion type in which the pattern is repeated for every four tracks.

When reproducing the magnetic tape on which the recording is effected in the format illustrated in FIG. 1(a) by means of the rotary head, RF signals shown in FIG. 3(a) are obtained from the rotary head. If the RF signals are obtained by the reproduction from, for instance, the (A) odd-numbered track frame shown in FIG. 2 the pilot signals $f_1$ shown in FIG. 3(b) are obtained by use of a band pass filter of 130 KHz.

A section I is associated with the pilot signal on the ON-track. Sections II and III are associated with the cross talk of the pilot signals of the (B) odd-numbered track frame and of the (B) even-numbered track frame. When the rotary head adequately scans on the ON-track, envelope levels of the section II and III, i.e., $V_{II}$ and $V_{III}$ shown in FIG. 3(c), are originally equal. If a track-deviation is created, $V_{II} \neq V_{III}$. A quantity and direction of deviation of the rotary head in connection with the ON-track can be recognized from the magnitude and the polarity. A capstan servo is operated when a difference between $V_{II}$ and $V_{III}$ is detected, and a velocity of the tape is slightly adjusted, thereby causing the rotary head to run on the OM-track.

The requirements for such operations are that the SYNC signals, which have been positioned in predetermined locations, are exactly detected, and the levels of $V_{II}$ and $V_{III}$ are sampled. The R-DAT is not, however, provided with an erase head, so the second and third recordings are performed by overwriting. As a result, it is in some cases impossible to generate appropriate error signals by exactly detecting the SYNC signals and sampling $V_{II}$ and $V_{III}$.

Namely, the R DAT permits the recording to be done within plus or minus two blocks from the center of the PCM region, and the recording level of the pilot signal $f_1$ (=130 KHz) is a little bit lower than those of other signals during recording. The reason for this lower recording level is that as the frequency of the signal is lowered, its recording level to the tape is deepened, and hence it is required to erase the previously recorded pilot signals $f_1$ by erase signals $f_4$ when overwriting occurs. Although the levels of the pilot signals $f_1$ are thus decreased, some of the preceding SYNC signals often remain unerased while the pilot signals $f_1$ are newly recorded in the location of the previously recorded SYNC signals $f_2$ or $f_3$.

More specifically, if the subsequent recording is effected by deviating more in the forward direction than the preceding recording, the SYNC signals of the subsequent recording are invariably prior to the remaining, unerased SYNC signals of the previous recording on the track, which situation is not a problem. However, if the subsequent recording deviates in the backward direction, the remaining, unerased SYNC signals precede those of the subsequent recording. In this case, deviation ranges from one block to two blocks. The SYNC signals $f_2$ and $f_3$ of the previous recording partially or wholly remain in the locations of the pilot signals $f_1$ in the (A) even-numbered frame and (A) odd-numbered frame of the ATF-1 and in the (B) even-numbered frame and the (B) odd-numbered frame of the ATF-2.

When this happens, the level of the frequency component of the pilot signal within the reproduced RF signals is sampled at that time in accordance with the SYNC signals of the previous recording. This pilot signal originally has to assume a level of cross talk of the sampling signals on one adjacent track. However, the frequency component to be sampled is the pilot signal itself on the ON track. The level obtained by sampling achieves a considerably large value. Thereafter, the frequency component of the pilot signal within the reproduced RF signals subsequent to two blocks is sampled. A difference between the thus acquired sample value and a sample value before two blocks is obtained. The capstan servo is controlled on the condition that this level-difference is defined as a quantity of track-deviation. The previously sampled frequency component, however, assumes the level of the ON-track rather than the level of the cross talk of the contiguous track. Consequently, a level which is extraordinarily greater than the quantity of the actual track-deviation is obtained. Such being the case, the capstan servo undergoes a relatively large disturbance which will have undesirable effects on the condition under which the tape is fed.

SUMMARY OF THE INVENTION

It is a primary object of the present invention to overcome the above described problems to provide a rotary head type digital audio reproducing device capable of normally performing the tracking-control without causing malfunctions even if SYNC signals of the previous recording remain unerased in the locations preceding the SYNC signals of the subsequent recording, which is effected by overwriting.

To this end, according to one aspect of the invention, there is provided the rotary head type digital-audio reproducing device characterized in that: a level of cross talk of pilot signals on one adjacent track is sampled and held after a predetermined time has passed in accordance with a recording pattern, responding to a detection of the pilot signal; a signal for exhibiting a quantity of track deviation is formed from the thus held level and the level of cross talk of the pilot signals on the other adjacent track after the predetermined time has further passed, thereby controlling a capstan servo; and the correct tracking becomes possible without inducing any malfunctions even if a pseudo SYNC signal is overwritten at a location in front of the true SYNC signal, because the cross talk of one adjacent track is not immediately sampled and held in accordance with the detection of only the SYNC signal.

Other objects and advantages of the present invention will become evident upon reading the following description taken in connection with the accompanying drawings.

DESCRIPTION OF THE PREFERRED EMBODIMENT

Preferred embodiments of the present invention will hereinafter be described with reference to the accompanying drawings.

Figure 1A:
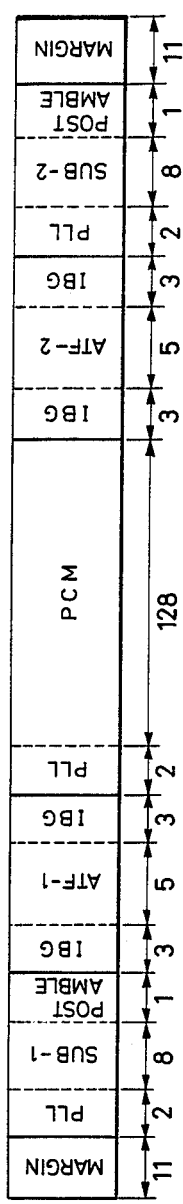
FIG. 1(a and 1(b) are explanatory diagrams showing a track format and a block format of a conventional R-DAT.
Figure 1B:
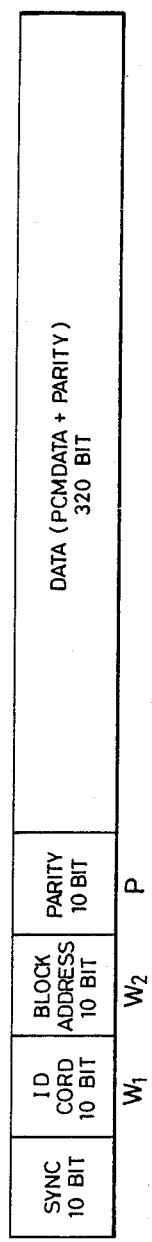
Figure 3:
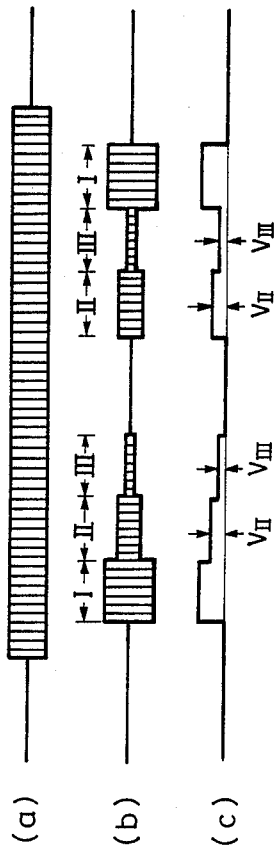
FIG. 3, (consisting of (a)–(c) is a diagram explaining a principle of tracking control based on the track pattern of FIG. 2.
Figure 2:
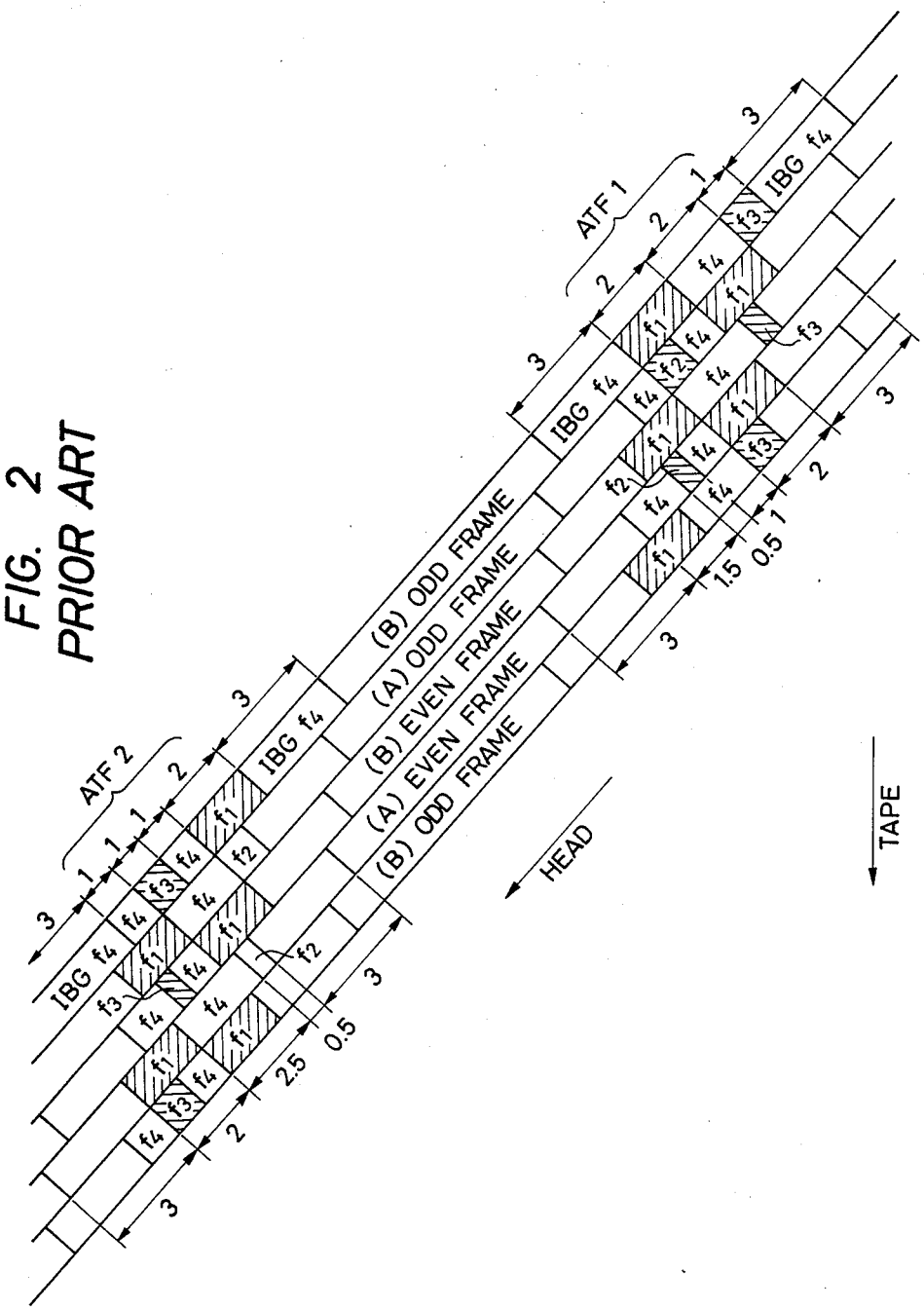
FIG. 2 is a diagram showing an ATF track format of the R-DAT of FIGS. 1(a) and 1(b)
Figure 4:
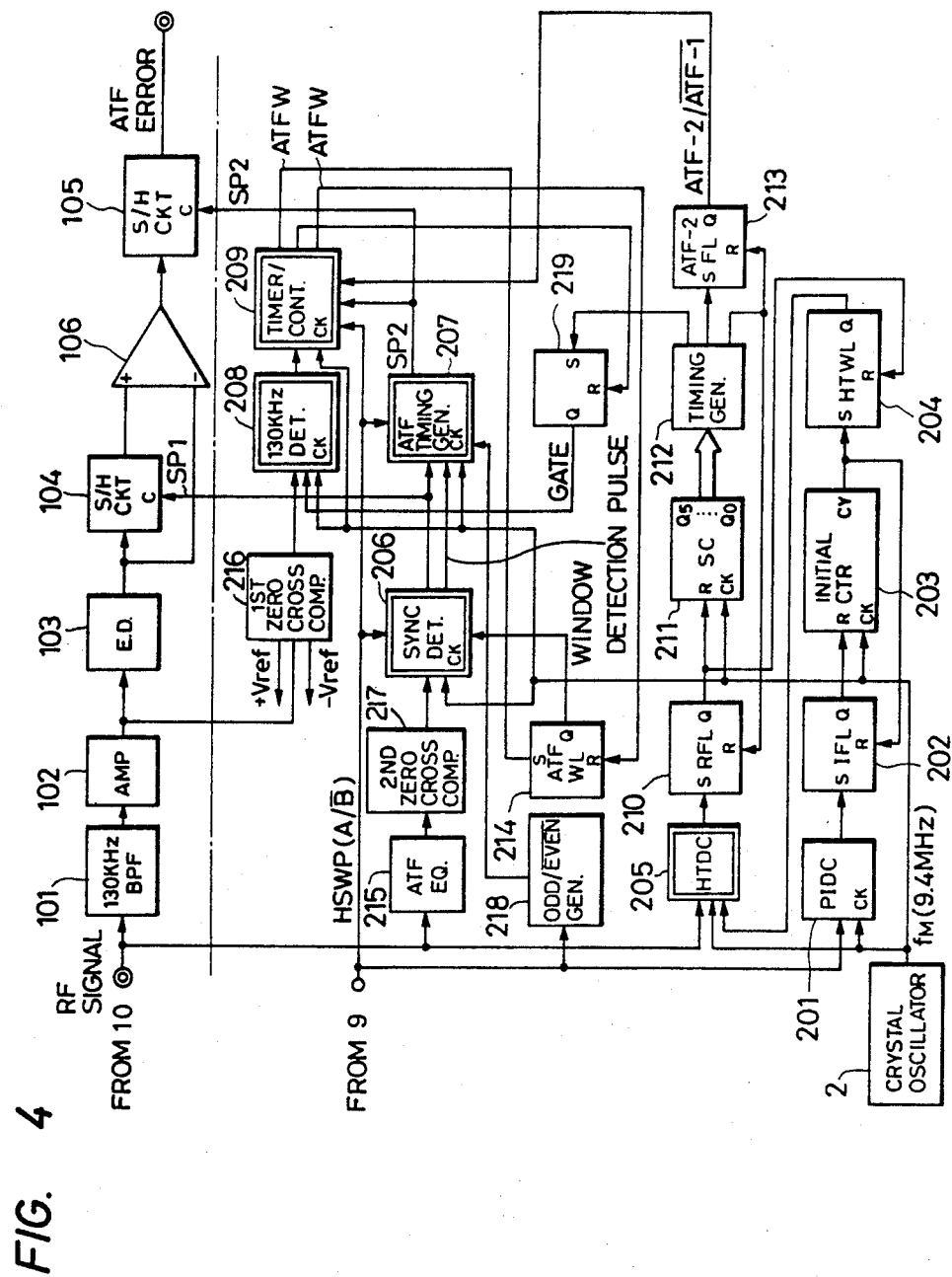
FIG. 4 is a block diagram of a principal portion of a rotary head type digital-audio reproducing device, showing one embodiment of the present invention.
Figure 5:
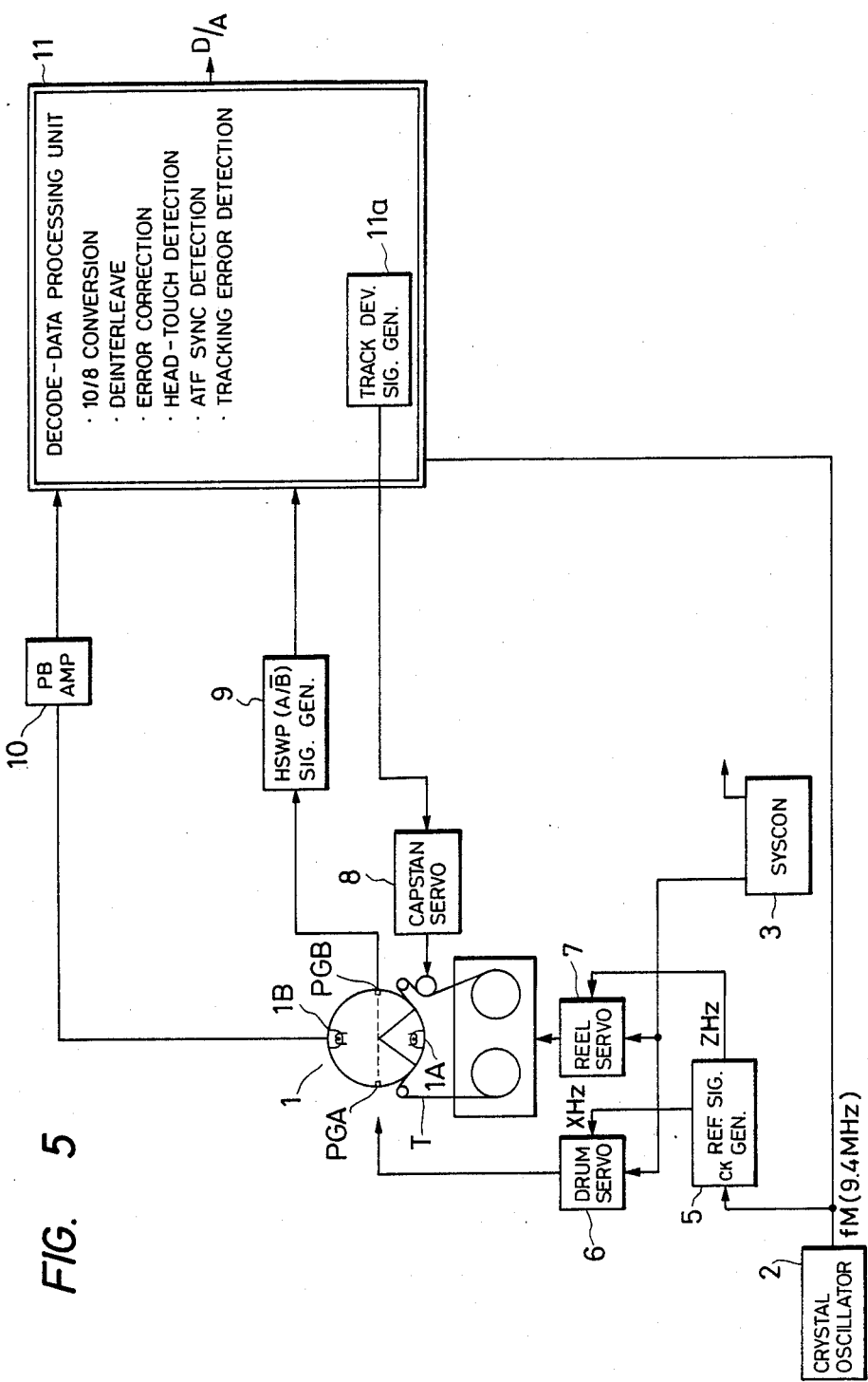
FIG. 5 is a block diagram schematically showing the entire device of FIG. 4.

FIG. 4 is a block diagram illustrating a principal portion of a rotary head type digital-audio reproducing device of FIG. 5 showing the whole device.

To start with, the whole device shown in FIG. 5 will be explained. In FIG. 5, the reference numeral 1 represents a rotary drum having a diameter of 30 mm. The rotary drum 1 includes an A-rotary head 1A for reproducing (+) azimuth and a B-rotary head 1B for reproducing (−) azimuth, these two rotary heads being spaced away from each other at an angle of 180°. A pair of pulse generators (PG) PGA and PGB are disposed in the intermediate position between the A-rotary head 1A and the B-rotary head 1B.

The numeral 2 denotes a crystal oscillator for generating fundamental clocks $f_M$ each having a frequency of 9.4 MHz. The fundamental clocks $f_M$ are supplied to the respective components of the system.

The numeral 3 designates a system controller (SYSCON) for controlling the system.

The numeral 5 stands for a reference signal generator (REF. SIG. GEN.) for generating reference signals of X Hz (when 66 Hz 2PG) and Z Hz on the basis of the fundamental clocks $f_M$ applied to an input CK.

The numeral 6 denotes a drum servo for servo-controlling the rotation of a drum motor on the basis of the reference signal X Hz under control of the system controller 3. The numeral 7 designates a reel servo for servo-controlling the rotation of a reel motor on the basis of the reference signal Z Hz under control of the system controller 3. The numeral 8 represents a capstan servo for servo-controlling the rotation of a capstan motor on the basis of a quantity of track-deviation at the time of reproduction.

The numeral 9 stands for an HSWP (A/B̄) signal generator for generating HSWP (A/B̄) signals serving to effect a change-over between the A rotary head 1A and the B rotary head 1B on the basis of the pulses from the two PGs on the drum 1. The HSWP (A/B̄) signals become "H" on the occasion of the A-rotary head but become "L" on the occasion of the B-rotary head. The HSWP (A/B̄) signals are supplied to each component of the system.

The numeral 10 denotes a reproduction amplifier for amplifying the signals transmitted from the rotary heads 1A and 1B and feeding the thus amplified signals to a decode-data processing unit 11 which will be mentioned later.

The decode-data processing unit 11 extracts the data from the RF signals transmitted from the reproduction amplifier 10. The same processing unit 11 effects 10/8 conversion (demodulation), deinterleave and error correction on the data, and subsequently the thus processed data are sent to a D/A converting unit. The decode data processing unit 11 further performs head-touch detection, ATF SYNC detection and tracking error detection; and thereafter this unit 11 permits a track deviation signal generator (TRACK DEV. SIG. GEN.) 11a to supply the capstan servo 8 with error signals.

The capstan servo 8 functions on the basis of the quantity of track-deviation which is determined by the decode data processing unit 11. The quantity of track-deviation implies the ATF error signal corresponding to a level-difference between the amplitudes of cross talk of the pilot signals on the two contiguous tracks. This will be fully described later.

The HSWP (A/B̄) generator 9 generates the HSWP (A/B̄) signals which become "H" for the A head 1A but become "L" for the B head 1B on the basis of the pulse produced by the pulse generators PGA and PGB when the drum 1 rotates.

The components of the decode data processing unit 11 which are associated especially with the tracking control will be fully explained with reference to the block diagram of FIG. 4.

An analog system is disposed above a dot and dash line in FIG. 4, while a digital system is disposed below the line. On the one hand, the analog system consists of a 130 KHz band pass filter (BPF) 101, and amplifier 102 (AMP), an envelope detector 103 (E.D.), first and second sample hold (S/H) circuits 104 and 105 and a differential amplifier 106.

On the other hand, the digital system is composed of a crystal oscillator 2, a phase inversion detection circuit (PIDC) 201, an initial counter 203, a head touch window latch 204, a head touch detection circuit (HTDC) 205, a SYNC detection circuit (SYNC DET.) 206, an ATF timing generation circuit 207, a 130 KHz detection circuit 208, a timer/controller 209, a reproduction flag latch 210, a system counter 211, a timing generator (TIMING GEN.) 212, an AFT-2 flag latch 213, an AFT window latch 214, an ATF equalizer (EQ) 215, first and second zero cross comparators (ZERO CROSS COMP.) 216 and 217, an ODD/$\overline{\text{EVEN}}$ generation circuit 218 and a latch 219.

The description will begin with the analog system. The RF signals transmitted from the rotary heads 1A and 1B which are to be input from the reproduction amplifier 10 (FIG. 5) are input to the 130 KHz BPF 101. The BPF 101 permits the passage of only the 130 KHz component of the RF signals, the 130 KHz component being input via the amplifier 102 to the envelope detector 103. The envelope detector 103 envelope-detects the 130 KHz component and applies the thus detected component to a (−) input of the differential amplifier 106 and to an input of the S/H circuit 104.

The S/H circuit 104 samples the outputs of the envelope detector 103 with the aid sampling signals SP1 which are applied from the SYNC detection circuit 206 to an input C, and the sampled outputs are then applied to a (+) input of the differential amplifier 106. A level which is sampled and held by the S/H circuit 104, viz., temporarily stored, is the DC level of cross talk of the pilot signals on one adjacent track.

Output signals of the differential amplifier 106 are input to the S/H circuit 105. The S/H circuit 105 samples and holds these signals by employing sampling signals SP2 transmitted from the ATF timing generator 207 and the supplies the capstan servo 8 (FIG. 5) with these signals as ATF error signals. The error signal implies a difference between the DC levels of cross talk of the two contiguous tracks.

The differential amplifier 106 takes the difference between the outputs of the envelope detector 103 which are applied to the (−) input and the outputs of the S/H circuit 104 which are applies to the (+) input. The differential amplifier 106 further inputs the thus obtained difference to the S/H circuit 105. Namely, while the envelope detector 103 is sending the DC level of cross talk of the other contiguous track to the output thereof, the difference of cross talk between the two contiguous tracks, i.e., the quantity of track-deviation, is output.

Next, the digital system will be described. The fundamental clocks $f_M$ applied to an input CK and HSWP (A/$\overline{B}$) signals are input to the phase inversion detecting circuit 201 whose outputs are supplied to an input S of the initial flag latch 202. Input R of the initial flag latch 202 receives outputs CY of the initial counter 203, and outputs Q of the initial flag latch 202 are supplied to the input R of the initial counter 203.

When the initial counter 203 counts until reaching a predetermined value, the outputs CY become "H". The outputs CY are supplied to an input S of the head touch window latch 204. The window latch 204 generates a window for prohibiting touch detection during the occurrence of noise at the time of changing over the head, and its outputs Q are input to the head touch detection circuit 205.

The head touch detection circuit 205 detects inputting of the RF signals with the help of the signals transmitted from the window latch 204 and the fundamental clocks $f_M$. Detailed explanation of this situation will be given later.

The SYNC detection circuit 206 receives the following input signals: HSWP (A/$\overline{B}$) signals; the digitized RF signals sent from the second zero cross comparator 217; the fundamental clocks $f_M$ coming from the crystal oscillator 2 and the window signals transmitted from the ATF window latch 214. The sampling signals SP1 and detection pulse signals are sent to the output of the SYNC detection circuit 206. The sampling signals SP1 are then input to an input C of the S/H circuit 104 and to the ATF timing generation circuit 207. The SYNC detection circuit 206 detects the beginning of the ATF SYNC patterns SY1 and SY2 of the rotary heads 1A and 1B in response tot he digitized RF signals and then outputs the sampling signals SP1. Subsequent to this step the SYNC detection circuit 206 functions to output the detection pulse signals for the consecutively detected SYNCs. This will be fully described later.

The ATF timing generation circuit 207 receives the following signals: the HSWP (A/B$\overline{B}$) signals; the ODD-/$\overline{EVEN}$ signals transmitted from an ODD/$\overline{EVEN}$ generating circuit 218; the fundamental clocks $f_M$ from the crystal oscillator 2; the sampling signals SP1; and the detection pulses from the SYNC detection circuit 206. The sampling signals SP2 are generated at the output of the ATF timing generation circuit 207. The sampling signals SP2 are input to the input C of the S/H circuit 105 and to the timer controller 209, respectively. The situation will be fully explained later.

The 130 KHz detection circuit 208 receives the following signals: the fundamental clocks transmitted from the crystal oscillator 2; gate signals from a latch 219; and the digitized RF signals from the first zero cross comparator 216. The detection signals of the 130 KHz component of the RF signals are generated at the output of the 130 KHz detection circuit 208. The aforementioned detection signals are supplied to the timer/controller 209, which will hereinafter be described in detail.

The timer/controller 209 receives each of the following inputs: the HSWP (A/$\overline{B}$) signals; the fundamental clocks $f_M$; the detection signals transmitted from the 130 KHz detection circuit 208; the sampling signals SP2 from the ATF timing generation circuit 207 and ATF-2/$\overline{ATF-1}$ signals from an ATF-2 flag latch 213. ATF window ON signals. ATF window OFF signals and reset signals are generated at the output of the timer/controller 209. This will hereinafter be fully explained.

The reproduction flag latch 210 includes its input S to which the outputs of the head touch detection circuit 205 are input and its input R to which the reset signals from the timing generator 212 are input. The outputs Q of the reproduction flag latch 210 are input to the inputs R of the system counter 211 and of the window latch 204.

The system counter 211 has its input R to which the outputs Q of the reproduction flag latch 210 are input and its input CK to which the fundamental clocks are likewise input. The state outputs $Q_0$ through $Q_5$ of the system counter 211 are input to the timing generator 212. The outputs of the timing generator 212 are set signals sent to the ATF-2 flag latch 213, reset signals sent to the reproduction flag latch 210 and the ATF-2 flag latch 213, and set signals sent to the latch 219.

The ATF-2 flag latch 213 includes its set input S and its reset input R to which the reset signals and set signals transmitted from the timing generator 212 are input. The ATF-2/$\overline{AFT-1}$ signals are generated at the output Q of the ATF-2 flag latch 213 and are then applied to the timer/controller 209.

The ATF window latch 214 includes the set input S and the reset input R to which the ATF window signals and the ATF window "OFF" signals which are transmitted "ON" from the timer/controller 209 are input. The outputs Q of the window latch 214 are applied to the SYNC detection circuit 206.

The ATF equalizer 215 emphatically outputs the signals in the bands of the SYNC 1 ($f_2 = 520$ KHz) and the SYNC 2 ($f_3 = 784$ KHz) and further supplies these signals to the second zero cross comparator 217. The second zero cross comparator 217 converts the signals into "H" if an amplitude of the input signal is greater than a zero level but converts them into "L" if it is smaller than the zero level, and subsequently the comparator 217 outputs them. That is, the RF signals are converted into the digital signals which will be supplied to the SYNC detection circuit 206.

The first zero cross comparator 216 has an input to which the pilot signal component having 130 KHz of the RF signals is input via the 130 KHz BPF 101 and the amplifier 102. The first zero cross-comparator 216 compares the level of the signal component with a reference voltage ± Vref, and the digitized pilot signals are sent to the output thereof. Such digitized pilot signals are further supplied to the 130 KHz detection circuit 208.

For the system operation and data transfer. The fundamental clocks $f_M$ transmitted from the crystal oscillator 2 are applied to each input CK of the phase inversion detecting circuit 201, the initial counter 203, the system counter 211, the SYNC detection circuit 206, the ATF timing generation circuit 207, the 130 KHz detection circuit 208, the timer/controller 209 and the head touch detection circuit 205.

In the above described construction, the outputs of the phase inversion detecting circuit 201 to which the HSWP (A/$\overline{\text{B}}$) signals from the HSWP (A/$\overline{\text{B}}$) generator 9 (FIG. 5) are input become "H" during one fundamental clock just when the phase of the HSWP (A/$\overline{\text{B}}$) signal is inverted, viz., at the time when the rotary head is changed from IA to IB and vice versa The thus converted outputs are impressed on the set input S of the initial flag latch 202. Corresponding to this step, the outputs Q of the initial flag latch 202 become "H" and are then applied to the reset input R of the initial counter 203. Correspondingly, the initial counter 203 begins to count the fundamental clocks $f_M$ applied to the input CK. After the initial counter 203 has counted the fundamental clocks $f_M$ during a period equivalent to a time period during which noise is probably created at the time of changing over the head the outputs CY thereof become "H". The outputs CY are applied to the input R of the initial flag latch 202 and to the input S of the head touch window latch 204, respectively. The outputs Q of the initial flag latch 202 correspondingly become "L", and this latch 202 halts the operation of the initial counter 203. The outputs Q of the head touch window latch 204 become "H", and this latch 204 permits the head touch detection circuit 205 to perform its head touch detecting operation.

When the head touch detection circuit 205 detects the fact that the individual rotary heads 1A and 1B have been brought into contact with the tape, the outputs become "H" during one clock and are then applied to the input S of the reproduction flag latch 210. Corresponding to this step the outputs Q of the reproduction flag latch 210 become "H" and are respectively applied to the input R of the system counter 211 and to the input R of the window latch 204. As a result, the outputs Q of the window latch 204 become "L", thereby halting the operation of the head touch detection circuit 205. Simultaneously, the system counter 211 commences its counting operation.

The outputs $Q_0$ through $Q_3$ of the system counter 211 are applied to the timing generator 212. The timing generator 212 causes the outputs Q of the latch 219 to be "H" by applying the signals to the input S of the latch 219 and these signals become "H" eleven blocks before or after the region in which the ATF-1 and the ATF-2 are recorded. The set signals which become "H" in the vicinity of the center of the PCM region so that the ATF-1 and the ATF-2 are distinguishable from each other are applied to the input S of the ATF-2 flag latch 213, whereby the outputs Q become "H". The outputs Q of the ATF-2 flag latch 213 are applied to the timer/controller 209 as ATF-2/$\overline{\text{ATF-1}}$ signals. Upon a completion of reproduction by each rotary head, the timing generator 212 outputs the reset signals. Such signals are applied to the input R of the reproduction flag latch 210 and to the input R of the ATF-1 flag latch 213, whereby the outputs Q of the respective latches become "L". The inputs S of the latch 219 become "H". while the outputs Q thereof become "H". These outputs are applied to the 130 KHz detection circuit 208 as gate signals, thereby permitting the circuit 208 to detect the 130 KHz signals.

Next, the RF signals defined as the reproduction signals output by the rotary heads 1A and 1B are applied to each of the inputs of the 130 KHz BPF 101, the ATF equalizer 215 and the head touch detection circuit 205.

Only the 130 KHz components of the RF signals input to the 130 KHz BPF 101 are allowed to pass and are amplified by the amplifier 102. Subsequent to this step, the 130 KHz component is applied to the inputs of the envelope detector 103 and the zero cross comparator 216.

The envelope detector 103 converts the amplitudes of AC signals into DC levels to apply the DC level to the input of the S/H circuit 104 and to the (−) input of the differential amplifier 106, respectively. The S/H circuit 104 samples and holds the DC level of the outputs of the envelope detector 103 when the sampling signals SP1 are input to the input C. The sampling signals SP1 are output by the SYNC detection circuit 206 when the envelope detector 103 is outputting the DC level of cross talk of one adjacent track, and hence the DC level of cross talk of one adjacent track is held in the S/H circuit 104.

Since the outputs of the S/H circuit 104 are applied to the (+) input of the differential amplifier 106, the signals each having a magnitude equivalent to the difference component of cross talk between the two adjacent tracks, i.e., the quantity of track-deviation are sent to the output of the differential amplifier 106, when the cross talk DC level of the other adjacent track is output at the output of the envelope detector 103.

The outputs of the differential amplifier 106 are applied to the input of the S/H circuit 105 which samples and holds the input signal level when the sampling signals SP2 are applied to the input C. The sampling signals SP2 are applied from the ATF timing generation circuit 207 to the input C of the S/H circuit 105, when the DC level of cross talk of the other contiguous track is sent to the output of the envelope detector 103. Therefore, the difference component of cross talk between the two adjacent tracks is held in the S/H circuit 105, this difference component being applied to the capstan servo circuit 8 (FIG. 5) as an ATF error signal.

In contrast, the first zero cross comparator 216 to which the 130 KHz component is supplied from the amplifier 102 has a blind sector with respect to + |Vref| and does not function in response to the noise. The first zero cross comparator 216 operates so that the outputs thereof become "H" when the amplitude of 130 KHz component exceeds + |Vref|, but they become "L" when the amplitude is smaller than − |Vref|. The outputs of the first zero cross comparator 216 is supplied to the 130 KHz detection circuit 208.

The 130 KHz detection circuit 208 applies the detection pulses to the timer/controller 209 by detecting the 130 KHz component. First, the timer/controller 209 detects the 130 KHz component. Second, the timer/controller 209 outputs the ATF window ON signals after three blocks in the case of the ATF-1 of the A track and the ATF-2 of the B track and after one block in the case of the ATF-2 of the track and the ATF-1 of the B track. The ATF window ON signals are then applied to the inputs S of the ATF window flag latch 214. The outputs Q of the ATF window flag latch 214 correspondingly become "H" whereby the SYNC detection circuit 206 is brought into an operable state.

Figure 6:
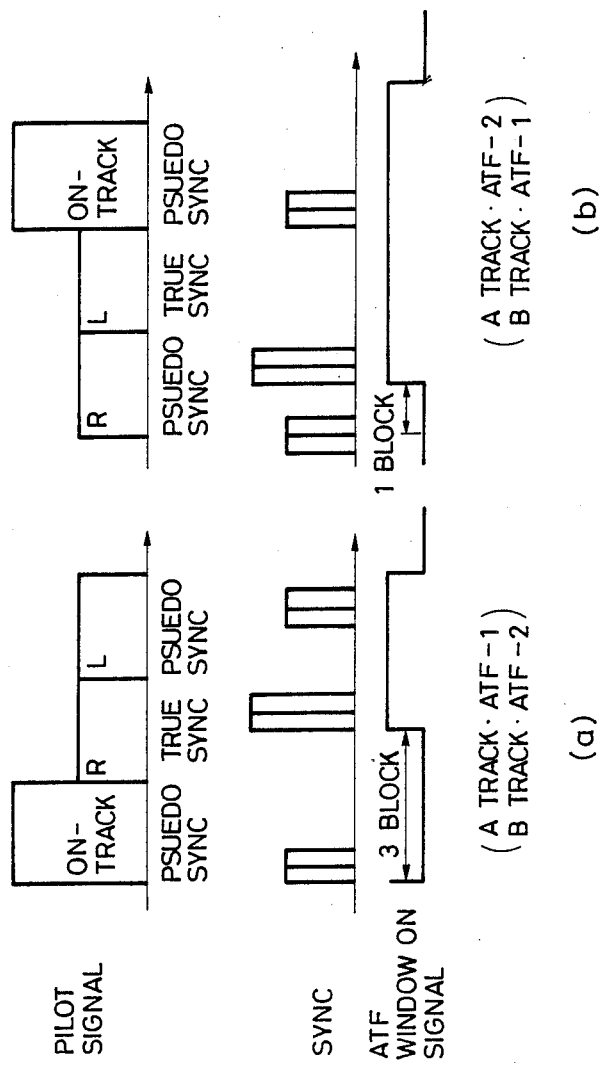
FIG. 6, consisting of (a) and (b), is a diagram explaining a principle of the present invention.

Namely, after detecting the 130 KHz component, the SYNC operation remains halted during three blocks in the case of the ATF-1 of the A track and the ATF-2 of the B track and during 1 block in the case of the ATF-2 of the A track and the ATF-1 of the B track. As is obvious from FIG. 6 exhibiting this relation, no pseudo SYNC signal will be detected prior to detection of the true SYNC signal.

The RF signals applied to the ATF equalizer 215 are further applied to the input of the second zero cross comparator 216 after the signal component in a band of the SYNC1 $f_2$ (=520 KHz) to the SYNC2 $f_3$ (=784 KHz) has been emphasized. The second zero cross comparator 217 outputs the signals which become "H" when its input is greater than zero but become "L" when it is smaller than zero. That is, the second zero cross comparator 217 effects a so-called digital conversion to apply such signals to the SYNC detection circuit 206.

The SYNC detection circuit 206 operates to detect the SYNC1 $f_2$ in the case of the rotary head 1A and the SYNC2 $f_3$ in the case of the rotary head 1B on the basis of the HSWP (A/$\overline{B}$) signals. The SYNC detection circuit 206 outputs the sampling signals SP1 in accordance with the detection of the first cycle of each SYNC. The sampling signals SP1 are supplied to the input C of the S/H circuit 104 and to the ATF timing generation circuit 207. The S/H circuit supplied with the sampling signals SP1 as described above, samples and holds the DC level of cross talk of one adjacent track, and immediately the ATF timing generation circuit 207 begins operating.

After outputting the sampling signals SP1 the SYNC detection circuit 206 supplies the ATF timing generation circuit 207 with the detection pulse signals for every detection of cycles of the SYNC1 $f_2$ and the SYNC2 $f_3$.

From the SYNC detection circuit 206 the ATF timing generation circuit 207 receives the detection pulse signals the number of which exceeds a prescribed number during a given period equivalent to one-half block or one block. The SYNC detection circuit 206 immediately outputs the sampling signals SP2 after two blocks from the sampling signals SP1, the sampling signals SP2 being applied to the input C of the S/H circuit 105 and to the timer/controller 209.

A timing at which the sampling signals SP2 are applied from the ATF timing generation circuit 207 to the S/H circuit 105 accords with the time when the DC level of cross talk of the other adjacent track is present. Hence, a DC level difference of cross talk between the two adjacent tracks is held in the S/H" circuit 105. The timer/controller 209 to which the sampling signals SP2 are applied has an output from which the ATF window OFF signals are output. The ATF window OFF signals are applied to the input R of the ATF window latch 214, whereby the outputs Q thereof become "L". In response to the "L" output from the ATF window latch 214, the SYNC detection circuit 206 stops its SYNC detection operation.

The head touch detection circuit 205 is, as explained earlier, intended to detect the fact that the RF signals are reproduced by causing the rotary head to come in contact with the tape when the outputs Q each assume an "H" level of the head touch window latch 204 and the fundamental clocks $f_M$. The head touch detection circuit 205 involves the use of, for instance one disclosed in the Japanese Patent Publication No. 162086/1986 (published under number 18565/1988 and having a corresponding U.S. patent application Ser. No. 07/072,822) whose application was made by the present applicant, and which is hereby incorporated by reference.

Figure 7:
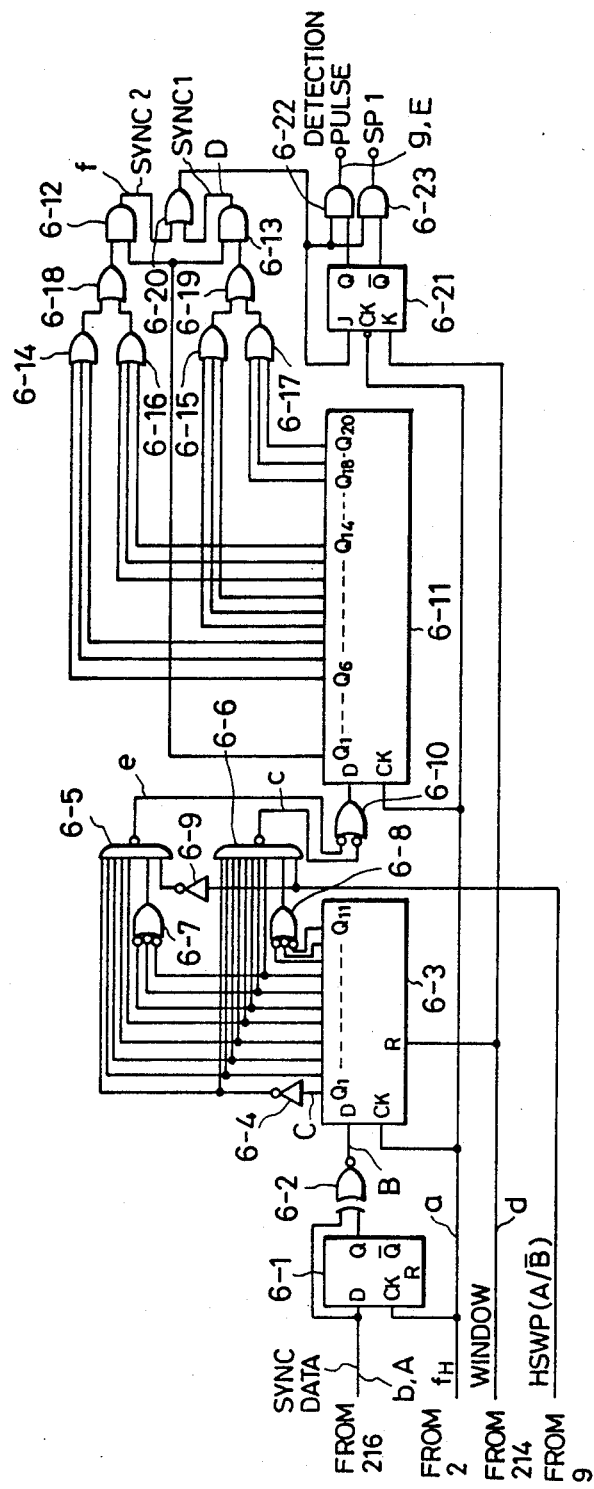
FIG. 7 is a block diagram illustrating one example of a SYNC circuit shown in FIG. 4.
Figure 8:
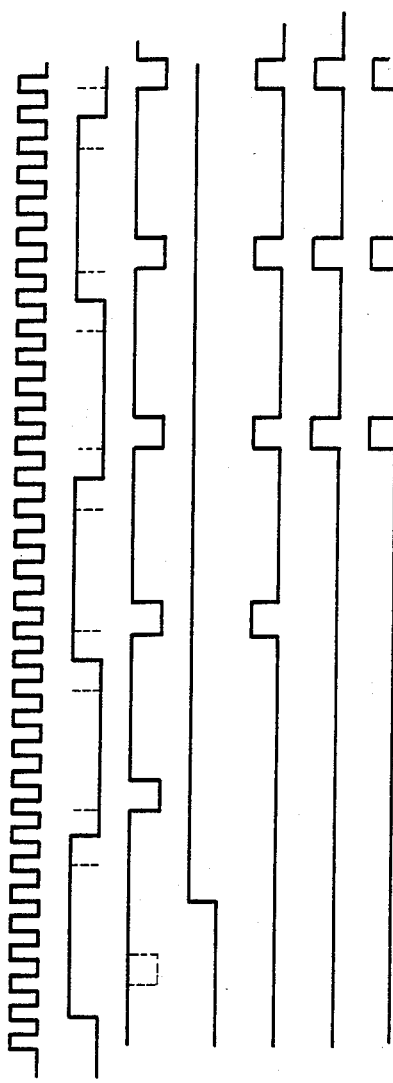
FIGS. 8(a)–(g) and 9(A)–(E) are timing charts each showing waveforms of the individual portions depicted in FIG. 7.
Figure 9:
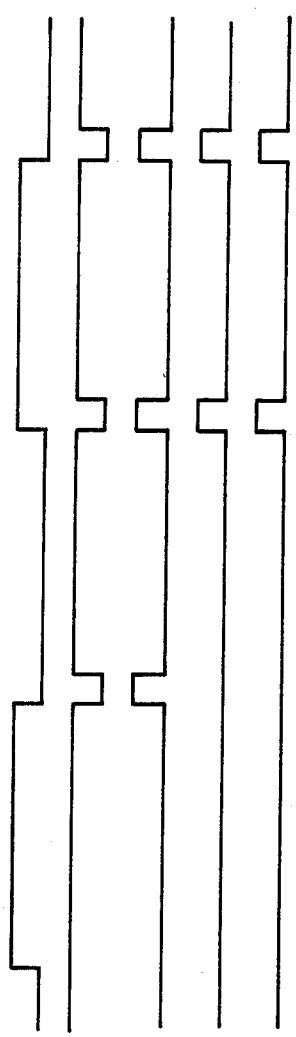

A circuit having the constitution depicted in FIG. 7, for example, can be used as the SYNC detection circuit 206.

In FIG. 7, the SYNC detection circuit 206 receives the following inputs, the digitized SYNC data transmitted from the second zero cross comparator 217; the fundamental clocks from the crystal oscillator 2; the window signals from the ATF window latch 214; and the HSWP (A/$\overline{B}$) signals from the HSWP (A/$\overline{B}$) generation circuit 9.

The SYNC data from zero cross comparator 217 is supplied to an input D of a D type flip-flop (FF) 6-1 having an input CK to which the fundamental clocks $f_M$ are input. At the same time, the SYNC data are also supplied to one input of an exclusive OR (EOR) gate 6-2. The outputs Q of the D type FF 6-1 are supplied to the other input of the EOR gate 6-2. The EOR gate 6-2 and the D type FF 6-1 are combined to form a phase inversion detecting circuit.

The outputs of the EOR gate 6 2 are supplied to the input D of an 11-stage shift register 6-3 including its input CK to which the fundamental clocks $f_M$ are input and its input R to which the window signals from the ATF window latch 214 are input. The outputs $Q_1$ of the 11 stage shift register 6-3 are supplied via an inverter 6 4 to NAND gates 6-5 and 6-6 while outputs $Q_2$ through $Q_5$ are directly supplied to NAND gates 6-5 and 6-6. The outputs $Q_6$ through $Q_8$ are supplied to a NOR gate 6-7 and the NAND gate 6-6. The outputs $Q_9$ through $Q_{11}$ are supplied to the NOR gate 6-8. The outputs of the NOR gates 6-7 and 6-8 are supplied to the NAND gates 6-5 and 6 6 respectively. The outputs of the NAND gates 6-5 and 6-6 are supplied to the inputs of the NOR gate 6-10.

The outputs of the NOR gate 6-10 are supplied to the input D of a 20-stage shift register 6-II having an input CK to which the fundamental clocks $f_M$ are input. The outputs $Q_1$ of the 20-stage shift register 6-11 are supplied to one of the inputs of each of the AND gates 5-12 and 6-13; the outputs $Q_6$ through $Q_8$ which become "H" in the case of the SYNC2 signal are supplied to the inputs of the OR gate 6-14; tho outputs $Q_9$ through $Q_{11}$ which become "H" in the case of the SYNC1 signal are supplied to the inputs of the OR gate 6-15; the outputs $Q_{12}$ through $Q_{14}$ which become "H" in the case of the SYNC2 signal are supplied to the inputs of the OR gate 6-16: and the outputs $Q_{18}$ through $Q_{20}$ which become "H" in the case of the SYNC1 signal and the SYNC2 signal are supplied to the inputs of the OR gate 6-17.

The outputs of the OR gates 6-14 and 6-16 are supplied via the OR gate 6-18 to the other input of the AND gate 6 12; and the outputs of the OR gates 6-15 and 6-17 are supplied via the OR gate 6-19 to the other input of the AND gate 6-13 The outputs of the AND gates 6-12 and 6-13 are supplied to the inputs of the OR gate 6-20: and the outputs of the OR gate 6-20 are respectively supplied to an input J of a JK flip-floop (JKFF) 6-21 and to one of the inputs of each of the AND gates 6-22 and 6-23.

The fundamental clocks $f_M$ are input to the input CK of the JKFF 6-21 and the window signals are input to the input K thereof. The outputs Q and $\overline{Q}$ of the JKFF 6-21 are supplied to the other inputs of the AND gate 6-22 and 6-23, respectively. The pulse detection signals and the sampling signals SP1 are respectively sent to the outputs of the AND gates 6-22 and 6-23.

With this construction, the SYNC detection circuit 206 operates in the following manner.

Where the SYNC data corresponding to the SYNC1 and SYNC2 signals are input, the outputs of the EOR gate 6 2 which are equivalent to one clock become "H". The shift register 6-3 including the input D to which the outputs of the EOR gate 6-2 are applied fetches the input D in accordance with risings of the fundamental clocks $f_M$ applied to the input CK when the window signals applied to the input R become "H". Thereafter the shift register 6-3 sends the inputs D to the output $Q_1$. Consequently, the shift register 6-3 sequentially shifts for every rising of the fundamental clocks $f_M$ for transmission to the outputs $Q_2$ through $Q_{11}$. Namely, the shift register 6-3 sends the outputs of the EOR gate 6-2 to the outputs $Q_1$ through $Q_{11}$ with a delay equivalent to one through eleven clocks.

When the outputs Q1 are "L", viz., where some variations are present, they are applied through the inverter 6-4 to the NAND gates 6-5 and 6-6, and any one of the outputs $Q_6$ through $Q_8$ becomes "L". At this time, one of the inputs of the NAND gate 6-5 is forced "H" by means of the NOR gate 6-7. Where no variation is present. The outputs $Q_2$ through $Q_5$ are "H". When the HSWP (A/$\overline{B}$) are "L", an "H" is applied via the inverter 6-9 to the input of the NAND gate 6-5.

Under such circumstances all the inputs of the NAND gate 6-5 become "H", and the outputs thereof become "L". Hence if this requirement is not satisfied, the outputs remain "H", and no variation can be seen with the minimum four clocks. The variation takes place during a period of five through seven clocks. A one-half cycle of the SYNC2 signal is detected when the reproduction is effected by the B rotary head IB on the condition that the HSWI (A/$\overline{B}$) signals are "L". As a matter of fact, the SYNC2 signals are $f_3$ (=784 KHz. $f_M/12$), so that an unvaried length is equivalent to six clocks. In addition, there is a margin or ± one clock, taking the timing of the clock and the jitter into consideration.

From the output of the NAND gate 6-5 the pulses which become "L" during one clock for every one-half cycle of the SYNC2 signal are output. The SYNC1 signals $f_2$ (=520 KHz. $f_M/18$) are detected from the outputs of the NAND gate 6-6 by the same processing as the SYNC2, when the HSWP (A/$\overline{B}$) become "H", i.e., during the reproduction performed by the A rotary head 1A. Such SYNC signals $f_2$ are output from the NAND gate 6-6. It is to be noted that a period for which no variation is present implies seven clocks but the variation appears during a period of eight through ten clocks.

The SYNC2 signals are output via the NOR gate 6-10 from the NAND gate 6-5 when the HSWP (A/$\overline{B}$) signals are "L". The SYNC1 signals are output via the NOR gate 6 10 from the NAND gate 6-6 when the HSWP (A/$\overline{B}$) signals are H. The SYNC1 and SYNC2 signals are applied to the input D of the shift register 6-11. In the NOR gate 6-10, when the one input thereof becomes "L", the output thereof becomes "H".

The 20-stage shift register 6-11 stores a state of the input D at the rising of the clock and then sends it to the output $Q_1$. Subsequently, the 20-stage shift register 6-11 effects the shifting operation every time the clock is applied for transmission to the outputs $Q_2$ through $Q_{20}$. That is, the state of the input D is output to the outputs $Q_1$ through $Q_{20}$ with a delay equivalent to a period of one through twenty clocks.

If there is a variation in the output $Q_1$ of the shift register 6-11, the output $Q_1$ becomes "H". In connection with the SYNC2 signal ($f_3$ 780 KHz, $1/12f_M$), Where the variation is present before one-half cycle with the output $Q_1$ defined as the basis the outputs of the OR gate 6-14 become "H". If the variation appears before one cycle, the outputs of the OR gate 6-16 become "H". Therefore, the outputs of the OR gate 6-18 become "H", if the variation is present before one-half cycle or one cycle. The outputs of the OR gate 6-18 as well as the outputs $Q_1$ of the shift register 6-11 are applied to the input of the AND gate 6-12. Namely, in the case of the SYNC2, after detecting the SYNC2 signal by means of the AND gate 6-12, the outputs appear in the output $Q_1$ after a delay of one block. At this time, the variation before one-half cycle is applied via the OR gates 6-14 and 6-18 to the input of the AND gate 6-12, and simultaneously the variation before one block is applied via the OR gates 6-16 and 6-18. Then the outputs of the AND gate 6-12 become "H", and correspondingly the outputs of the OR gate 6-20 become "H".

On the one hand, the outputs of the OR gates 6 14 and 6-16 which are connected to the outputs $Q_6$ through $Q_8$ and $Q_{12}$ through $Q_{14}$ of the 20-stage shift register 6-11 become "H" at the time of the SYNC2, and hence the outputs of the AND gate 6-12 become "H". Such outputs are output via the OR gate 6-20 and the AND gate 6-23 as the sampling signals SP1 and are then applied to an input J of a JKFF 6-21, whereby the outputs Q of the JKFF 6-21 become "H" and the outputs $\overline{Q}$ become "L". The outputs Q are applied to the AND gate 6-22, and subsequently the detection pulse signals are output through the AND gate 6-22.

On the other hand the outputs of the OR gates 6-15, 6-17 and 6-19 become "H" at the time of the SYNC1, and the outputs of the AND gate 6-13 become "H". The same processes as those described above are performed.

FIGS. 8(a) through 8(g) are timing charts each illustrating the waveforms of the respective portions when detecting the SYNC2. In the Figures, corresponding symbols (a)–(g) are shown in FIG. 7.

FIGS. 9(A) to 9(E) are timing charts each illustrating the waveforms of the respective portions when detecting the SYNC1, and the corresponding symbols (A)–(E) are shown in the Figures.

Figure 10:
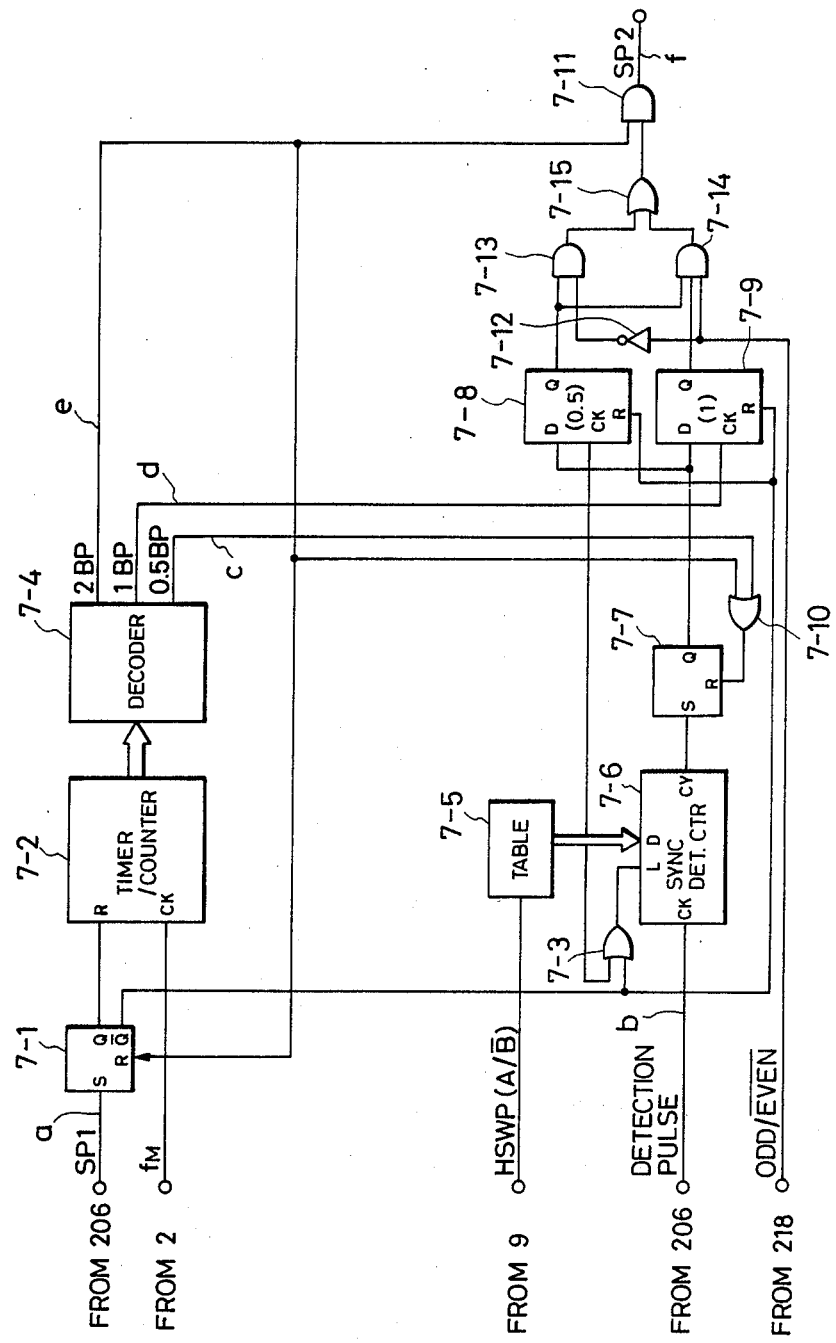
FIG. 10 is a block diagram illustrating one example of an ATF timing generation circuit shown in FIG. 4.

The ATF timing generation circuit 207 involves the use of, for example, a circuit having the construction depicted in FIG. 10.

The ATF timing generation circuit 207 receives the following inputs, the sampling signals SP1; the fundamental clocks $f_M$; the HSWP (A/$\overline{B}$) signals: the detection pulse signal from SYNC detection circuit 206; and the ODD/$\overline{EVEN}$ signals. The sampling signals SP1 are applied to the input S of the latch 7-1, and correspondingly the outputs Q of the latch 7-1 become "H". The outputs Q of the latch 7-1 are applied to the input R of a timer/counter 7-2, while the outputs $\overline{Q}$ are applied to one input of the OR gate 7-3. When the input R of the timer/counter 7-2 becomes "H", this timer/counter 7-2 counts the fundamental clocks $f_M$ applied to the input CK, and supplies the outputs to a decoder 7-4. The decoder 7-4 outputs the individual pulse signals of 0.5 BP, 1 BP and 2 BP for each of periods equivalent to one-half block, one block and two blocks.

The HSWP (A/$\overline{B}$) signals are applied to a table 7-5. Numerical values of the SYNC detection pulses associated with the A rotary head and the 3 rotary head are set in the table 7-5. The data signals associated with the A rotary head are applied to the input D of a SYNC detection counter 7-6 when the HSWP (A/$\overline{B}$) signals are "H", and similarly the data associated with the B rotary head are applied to the same input D when such signals are "L". The detection pulse signals transmitted from the SYNC detection circuit 206 are applied to the input CK of the SYNC detection counter 7-6. The SYNC detection counter 7-6 counts more detection pulse signals than the prescribed value whereby the outputs CY become "H". The outputs CY are applied to the input S of the latch 7-7, and the outputs Q of the latch 7-7 become "H" by virtue of the inputs S being "H". The outputs Q of the latch 7-7 are applied to the inputs D of D type FFs 7-8 and 7-9.

The 0.5 BP signals output from the decoder 7-4 are applied via the OR gate 7-3 to an input L of the SYNC detection counter 7-6 and applied via the OR gate 7-10 to the input R of the latch 7-7 and to the input CK of the D type FF 7-8. The 1 BP signals from the decoder 7-4 are applied to the input CK of the D type FF 7-9. The 2 BP signals from the decoder 7-4 are applied to the input R of the latch 7-1, applied via the OR gate 7-10 to the (−) input R of the latch 7-7, and further applied to one input of the AND gate 7-11.

The input D of each of the D type FFs 7-8 and 7-9 receives the outputs Q of the latch 7-7 which are "H" when the number of the detection pulse signals is more than the prescribed value but are "L" when the foregoing number is smaller than this value. Consequently, the D type FF 7-8 performs a temporary storage as to whether or not the SYNCs whose number is greater than the prescribed value are detected at the timing of 0.5 block. The 0.5 BP signals are applied via the OR gate 7-10 to the input R of the latch 7-7, and simultaneously the latch 7-7 is brought into an initial state, viz., the outputs Q are made to be "L". Then the SYNC detection counter 7 6 sets the data of the table 7-5.

Where the SYNC is one block, i.e., in the case of an odd-numbered frame, the detection pulse signals are recounted by the SYNC detection counter 7-6. In this case, the information as to whether or not the number of the detection pulse signals is greater than the prescribed value is temporarily stored in the D type FF 7-9 in response to the 1 BP signals transmitted from the decoder 7-4.

The ODD/$\overline{\text{EVEN}}$ signals which are inverted by the inverter 7-12 are applied to the input of the AND gate 7-13 but the ODD/EVEN signals which remain as they are applied to the input of the AND gate 7-14. The AND gate 7-13 undergoes the impression of the outputs Q of the D type FF 7-B. The AND gate 7-14 undergoes the impression of the outputs Q of the D type FFs 7-8 and 7-9. The outputs of the AND gates 7-13 and 7-14 are applied via the OR gate 7-15 to the other input of the AND gate 7-11.

Where the frame which is subjected to the reproduction is the odd-numbered one, the SYNC having a length of one block is recorded. In consequence, when the outputs Q of the D type FFs 7-8 and 7-9 are "H", the outputs Q are applied through the AND gate 7-14 and the OR gate 7-15 to the AND gate 7-11. The 2 BP signals are applied from the decoder 7-4 to the AND gate 7-11, at which time the sampling signals SP2 are sent to the output of the AND gate 7-11 after a time equivalent to two blocks has passed in the wake of the detection of the sampling signals SP1. That is, the sampling signals SP2 are output on the condition that the outputs Q of the D type FFs 7-8 and 7-9 are "H" and that the SYNC signals whose number is greater than the prescribed value are detected, these signals being so recorded as to be equivalent to one block.

In the case of an even-numbered frame, when the outputs Q of the D type FF 7-8 are "H", the outputs Q are applied via the AND gate 7-13 and the OR gate 7-15 to the AND gate 7-11. The 2 BP signals generated after two blocks from the sampling signals SP1 are allowed to pass through the AND gate 7-11, thereby sending the sampling signals SP2. As a matter of course, no sampling signals SP2 are output, unless the requirements are satisfied in the individual frames.

The aforementioned 2 BP signals serve to bring the latch 7-7 into its initial state through the OR gate 7-10, i e., the 2 BP signals cause the outputs Q to be "L". The 2 BP signals also bring the latch 7-1 into the initial state. As a result of this, the timer/counter 7-2 ceases counting and is at the same time reset to its initial state.

Figure 11:
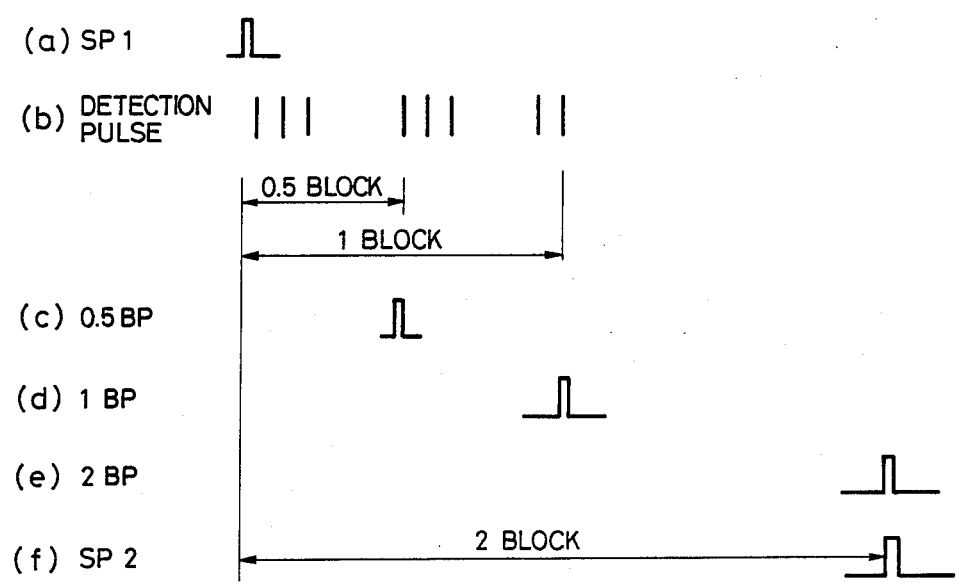
FIG. 11, consisting of (a)–(f), is a timing chart showing the waveforms of the individual portions depicted in FIG. 10.

FIG. 11 is a timing chart showing the waveforms of the respective portions of the ATF timing generation circuit 207. The corresponding symbols are shown in the FIG. 10.

Figure 12:
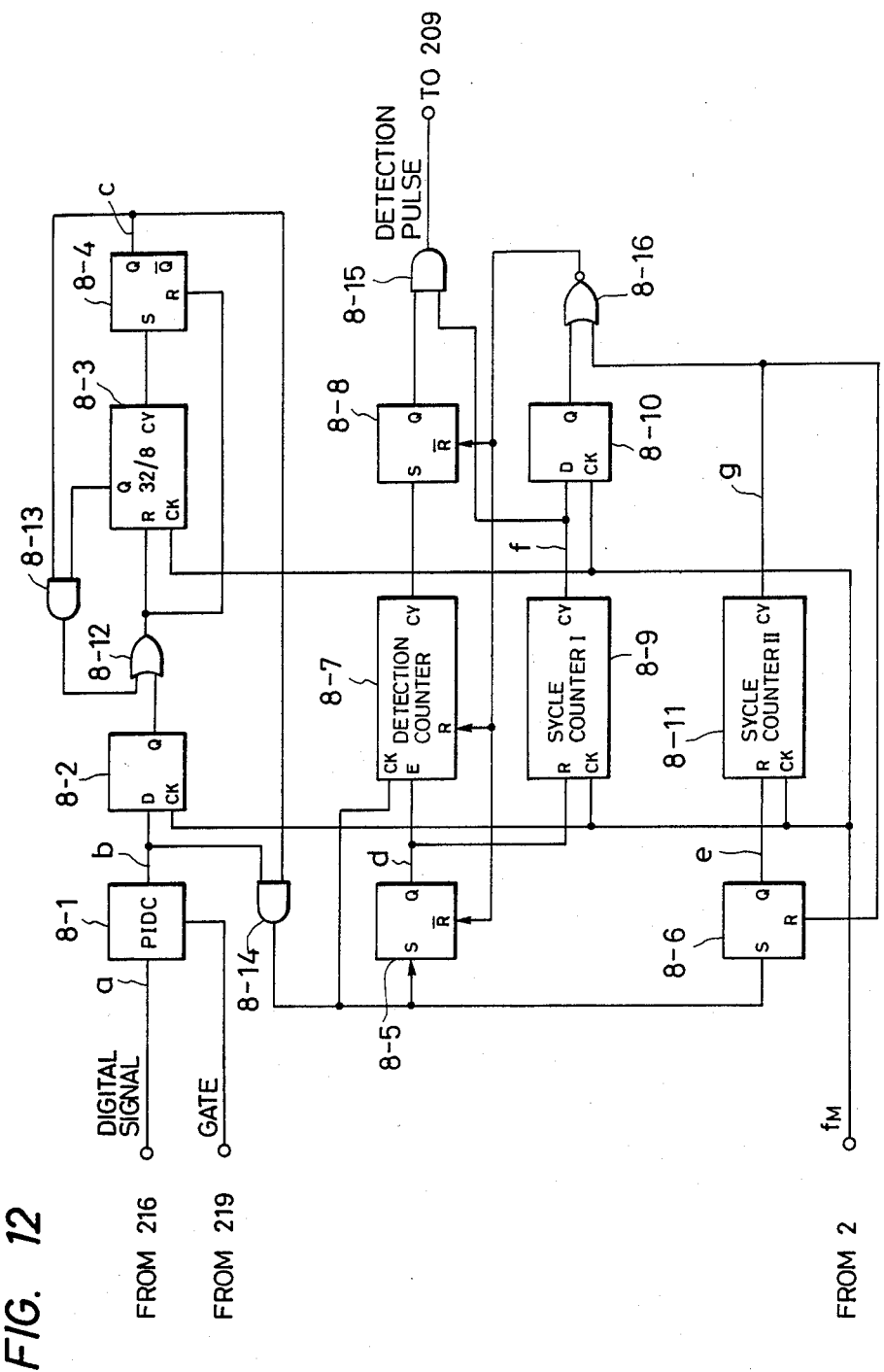
FIG. 12 is a block diagram showing one example of a 130 KHz detection circuit depicted in FIG. 4.
Figure 13:
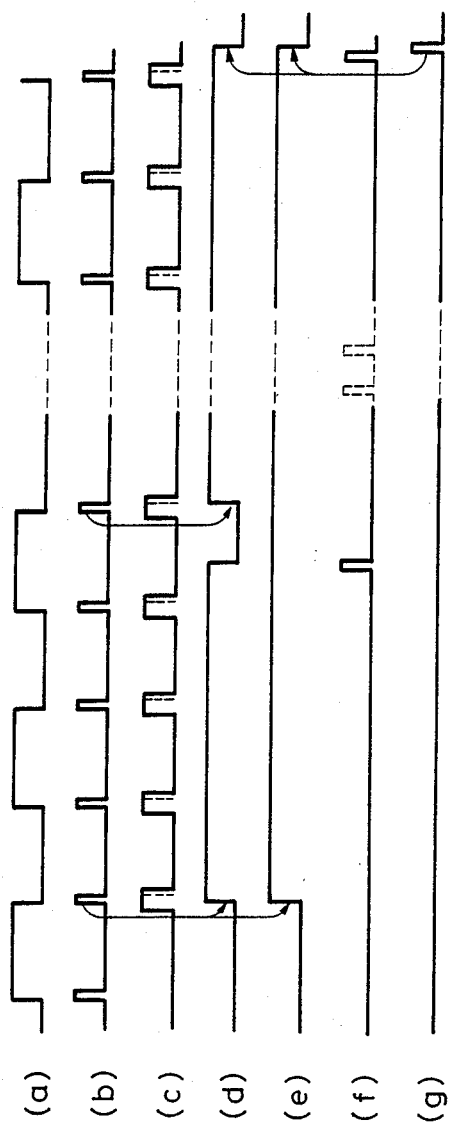
FIG. 13, consisting of (a)–(g), is a timing chart illustrating the waveforms of the individual portions depicted in FIG. 12.

The 130 KHz detection circuit 208 involves the use of, for instance, the circuit depicted in FIG. 12.

The digital signals having the 130 KHz component are applied from the zero cross comparator 216 (FIG. 4) to the phase inversion detecting circuit 8-1. The fundamental clocks $f_M$ are applied to the individual inputs CK of a D type FF 8-2, a 32/8 advancing counter 8-3, a first cycle counter (I) 8-9, a D type FF 8-10, and a second cycle counter (II) 8-11.

Excepting the above mentioned digital signals, the gate signals are input from the latch 219 to the phase inversion detecting circuit (PIDC) 8-1, and the outputs of the circuit 8-1 are applied to the input D of the D type FF 8-2 and to one input of the AND gate 8-14. The D type FF 8-2 signals are delayed by one clock and the outputs Q are applied via the OR gate 8-12 to the input R of the 32/8 advancing counter 8-3 and to the input R of the latch 8-4.

Immediately when the 32/8 advancing counter 8-3 counts 32 clocks the outputs CY become "H" during one clock and are then applied to the input S of the latch 8-4. The output Q of advancing counter 8-3 is applied to one input of the AND gate 8-13. The outputs Q of the latch 8-4 are applied to the other inputs of the AND gates 8-13 and 8-14, and the outputs of the AND gate 8-13 are applied to the OR gate 8-12. The outputs of the AND gate 8-14 are applied to the inputs S of the latches 8-5 and 8-6 and to the input CK of the detection counter 8-7.

The outputs of the latch 8-5 are applied to an input E of the detection counter 8-7 and to the input R of the first cycle counter 8-g. The outputs of the latch 8-6 are applied to the input R of the second cycle counter 8-11. The outputs CY of the detection counter 8 7 are applied to the input S of the latch 8-8, and the outputs Q of the latch 8-8 are applied to one input of the AND gate 8-15. The outputs Q of the latch 8-8 become "H" when there is a rising edge in the input S but become "L" when there is a falling edge in the input $\overline{\text{R}}$.

The outputs CY of the cycle counter I 8-9 are applied to the input D D type FF 8-10. The outputs of the Q of the D type FF 8 10 are applied to one input of the NOR gate 8-16.

The outputs CY of the second cycle counter 8-11 are applied to the other input of the NOR gate 8-16 and to the input R of the latch 8-6.

The outputs of the NOR gate 8-16 are respectively applied to the input R̄ of the latch 8-5, the input R of the detection counter 8-7 and the input R̄ of the latch 8-8. The detection pulses are sent from the output of the AND gate 8-15.

In the above described construction, when the phase of the digital signals is inverted, the outputs of the phase inversion detecting circuit 8-1 become "H" during one clock. The outputs of the phase inversion detecting circuit 8-1 are one-clock-delayed by the D type FF 8-2 and are then applied via the OR gate 8-12 to the input R of the 32/8 advancing counter 8-3 and to the input R of the latches 8-4. AS a result, the 32/8 advancing counter 8-3 is reset to zero, and its outputs Q of the latch 8-4 become "L".

The 32/8 advancing counter 8-3 counts 32 counts (pulses, cycles or the like) of the fundamental clocks $f_M$ input to the input CK, whereby the outputs CY become "H". For the purpose of applying the outputs CY to the input S of the latch 8-4, the outputs Q of the latch 8-4 become "U". The outputs of the AND gate 8-13 having its one input to which the outputs Q of the latch 8-4 are applied become "H", when the other input becomes "H". The output Q of the 32/8 advancing counter 8-3 is applied to the other input of the AND gate 8-13. Consequently, when the output Q becomes "H", viz., after the output CY of the 32/8 advancing counter 8-3 have become "H", eight counts (pulses, cycles or the like) of clocks (40-counts from the phase inversion) of the input CK are counted. Immediately, the outputs of the AND gate 8-I3 become "H" and are applied via the OR gate 8-12 to the inputs R of the 32/8 advancing counter 8-3 and the latch 8-4, whereby the counter 8-3 and the latch 8-4 are respectively reset to their initial state.

If the phase is inverted within 32 clocks after the phase inversion has been effected, the outputs CY of the 32/8 advancing counter 8-3 do not become "H", so that this counter 8-3 is reset to the initial state. The outputs Q of the latch 8-4 remain "L". When the phase inversion happens before counting eight clocks after the outputs CY of the 32/8 advancing counter 8-3 have become "H", i.e., when the phase inversion is effected from an "H" period of the outputs Q of the latch 8-4, the latches 8-5 and 8-6 are set through the AND gate 8-14, and the outputs Q thereof become "H". At this time, the 32/8 advancing counter 8-3 and the latch 8-4 are reset to their initial state.

The phase inversion detecting circuit 8-1, the D type FF 8-2, the 32/8 advancing counter 8-3, the latch 8-4, the OR gate 8-12 and the AND gates 8-13 and 8-14 are combined to form a circuit for detecting a given pulse width, viz., a ½ period of continuous frequency.

The SYNC1 signal $f_1$ is $f_M/72$, and hence this signal $f_1$ is originally 36. However, if prescribed pulse widths of 32 and 40 are detected, the outputs Q of the latches 8-5 and B-6 become "H", whereby the counters 8-7, B-9, and B-11 are brought into a countable state.

The outputs of the AND gate 8-14, i.e., the pulses which become "H" during one clock for every detection counter of one-half period are applied to the input CK of the detection counter 8-7. As a result, the detection counter 8-7 performs its counting operation. After the detection counter 8-7 has counted the prescribed value, the outputs CY become "H" and are then applied to the input S of the latch 8-8 to cause the outputs Q thereof to be "H". The outputs Q of the latch 8-8 are applied to one input of the AND gate 8-15. Namely, after the detection counter 8-7 has obtained a prescribed number of detection pulses of one-half period the counter 8-7 stands by while causing the one input of the AND gate 8-15 to be "H".

The first cycle counter 8-9 is designed for controlling the intervals for a specified period. After the outputs Q of the latch 8-5 have become "H", the first cycle counter 8-9 counts 126, viz.. ½ period ×3 +¼ period. Thereafter, when the outputs CY of the detection counter 8-7 become "H", one input of the AND gate 8-15 becomes "H" through the intermediary of the latch 8-8. In consequence, the outputs of the AND gate 8-15 become "H" during one clock because the output CY of the first cycle counter 8-9 has become "H". That is, the detection pulses are output.

If there are not the prescribed number of count pulses in the input CK of the detection counter 8-7, the outputs Q of the latch 8-8 remain "L", so that the detection pulses are not output from the AND gate 8-15.

The outputs CY of the first cycle counter 8-9 are one-clock-delayed by the D type FF 8 10 and then serve to bring the latches 8-5 and 8-8 as well as the detection counter 8-7 into their initial state through the NOR gate 8-16.

The second cycle counter 8-11 is intended to control a time width in which predetermined frequencies are recorded after detecting the first one-half period. In this example, the second counter 8-11 counts two blocks (76μs). and then the outputs CY become "H". The latches 8-5, 8-8, and 8-6 and the detection counter 8-7 are brought into their initial states. Simultaneously, the first cycle counter 8-9 and the second cycle counter 8-11 are reset to their initial states.

FIGS. 13(a) through 13(g) are timing charts illustrating the waveforms of the individual portions of the circuit depicted in FIG. 12. The corresponding symbols are shown in the circuit.

Figure 14:
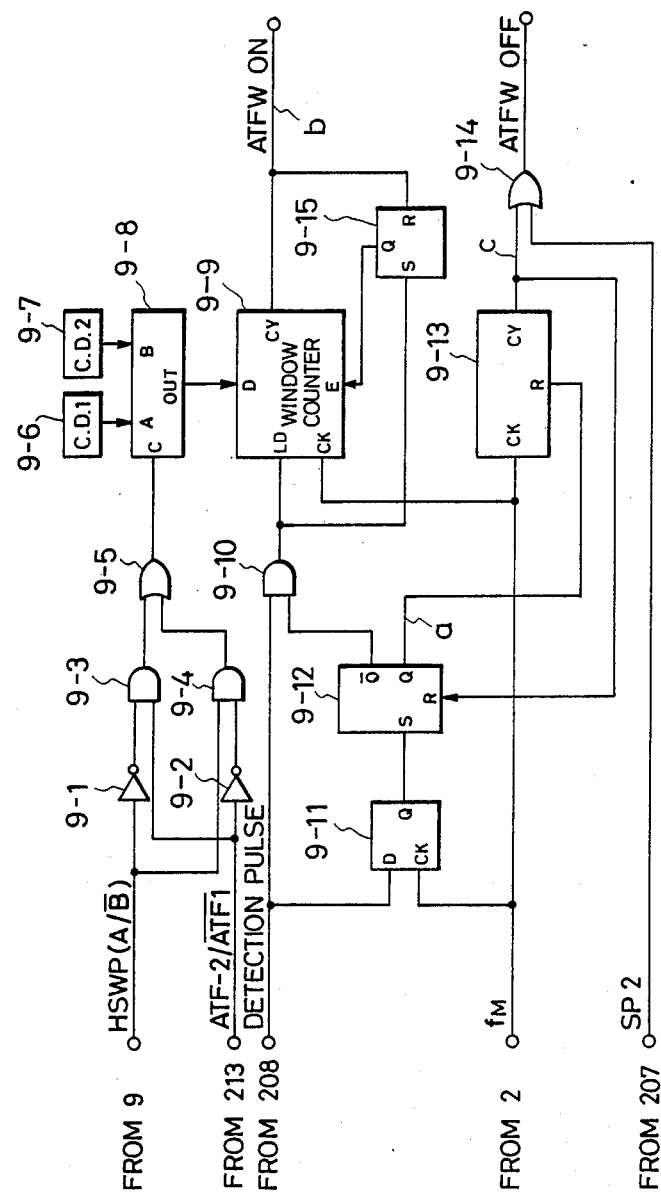
FIG. 14 is a block diagram illustrating one example of a timer/controller depicted in FIG. 4.

The timer/controller 209 involves the use of, for instance, a circuit such as the one illustrated in FIG. 14.

The HSWP (A/B̄) signals are applied to the sole input of an inverter 9-1 and one of the inputs of an AND gate 9-4. The ATF-2 ATF-1 signals are applied to the sole input of an inverter 9-2 and one of the inputs of an AND gate 9-3. The 130 KHz detection pulses are applied to one input of the AND gate 9-10 and to the input D of the D type FF 9-11. The fundamental clocks $f_M$ are supplied to the inputs CK of the D type FF 9-11 and to the inputs CK of the counters 9-9 and 9-13.

The output of the inverter 9-1 is applied to the other input of the AND gate 9-3, while the output of the inverter 9-2 is applied to the other input of the AND gate 9-4. The outputs of the AND gates 9-3 and 9-4 are applied via the OR gate 9-5 to the input C of a selection circuit 9-8. The selection circuit 9-8 has inputs A and B to which count data (C.D.1, C.D.2) 9-6 and 9-7 are input. The selection circuit 9-8 selects the input A when the input C is "H" but selects the input B when the input C is "L". The selected data is applied from output OUT of the selection circuit 9-8 to the input D of a window counter 9-9.

The outputs of the AND gate 9-10 are applied to an input LD of the window counter 9-9, and the outputs CY of the window counter 9-9 output as the ATF window signals. The AND gate 9-10 includes an input to which the outputs Q̄ of the latch 9-12 are applied. The outputs of the AND gate 9-10 are applied to the input LD of the window counter 9-9 and the input S of the latch 9-15.

The D type FF 9-11 has the input D to which the detection pulses are input and the input CK to which the fundamental clocks $f_M$ are likewise input. The outputs Q of the D type FF 9-11 are applied to the input S of the latch 9-12. The outputs Q of the latch 9-12 are applied to the input R of the timer/counter 9-13. The timer/counter 9-13 functions as a counter of six blocks and the outputs CY thereof are output as the ATF window signals through OR gate 9-14, the ATF window signals output from the timer/counter 9-13 being applied to the input R of the latch 9-12. The sampling signals SP2 are also input to the input of the OR gate 9-14.

The latch 9-15 includes its input S to which the outputs of the AND gate 9-10 are applied and its input R to which the outputs CY of the window counter 9 9 are applied The outputs Q of the latch 9-15 are applied to an input E of the window counter 9-9.

In the above described construction, in the case of ATF-1 of the A track and ATF-2 of the B track, "H" signals are applied to the input C of the selection circuit 9-8 in response to the ATF-2/$\overline{\text{AFT-1}}$ signals and the HSWP (A/$\overline{\text{B}}$) signals which are input through the inverters 9-1 and 9-2, the AND gates 9-3 and 9-4 and the OR gate 9 5. Where the input C is "H", the selection circuit 9-8 is set to the input A. To be specific count values equivalent to three blocks are applied from the data 9-6 to the input D of the window counter 9-9.

When the detection pulses are input, the latch 9-12 is at first kept in the initial state the output $\overline{Q}$ thereof is "H", and the other input of the AND gate 9-10 is "H". Therefore, the input LD of the window counter 9-9 is made "H" through the AND gate 9-10: the data of the input D are set; and, simultaneously the first detection pulses are applied to the input S of the latch 9-15 to cause the output Q thereof to be "H". The input E of the window counter 9-9 becomes "H" because the output Q of the latch 9-15 is "H". Then the counting operation is performed.

After the detection pulses have been one clock-delayed by the D type FF 9-II, the detection pulses are applied to the input S of the latch 9-12, with the result that the outputs Q and $\overline{Q}$ of the latch 9-12 become "H" and "L", respectively. The other input of the AND gate 9-10 become "L", and hence the detection pulses do not pass through the AND gate 9-10. The input R of the counter 9-13 becomes "H" when the output Q assumes an "H" valve. Then, the counting operation begins.

Where the outputs of the OR gate 9-5 are "H", viz., in the case of the ATF-1 of the A track or the ATF-2 of the B track, the selection circuit 9-8 selects the input A. i.e., 3 block-count data. The selection circuit 9-8 sets the data in the window counter 9-9. When the counting equivalent to three blocks (114μs) is effected, the outputs CY of the counter 9-9 become "H" and are then supplied as the ATF window ON signals. The ATF window ON signals are applied to the input R of the latch 9-15, whereby the outputs Q thereof become "L". The window counter 9-9 then ceases to count.

Similarly where the outputs of the OR gate 9-5 are "L", viz., in the case of the ATF-2 of the A track or the ATF-1 of the B track, the selection circuit 9-8 selects the input B. i.e., one-block count data. The selection circuit 9-8 sets the data in the window counter 9-9. After counting one block, the counter 9-9 supplies the ATF window ON signals and performs the same operation as that described above.

The counter 9-13 counts six blocks and its output CY thereby becomes "H". The output CY is applied to the input R of the latch 9-12. As a result, the outputs Q and $\overline{Q}$ become "L" and "H", respectively. The ATF window OFF signals are supplied through the OR gate 9-14. Even if the sampling signals SP2 are input, the ATF window OFF signals are supplied through the OR gate 9-14.

Figure 15:
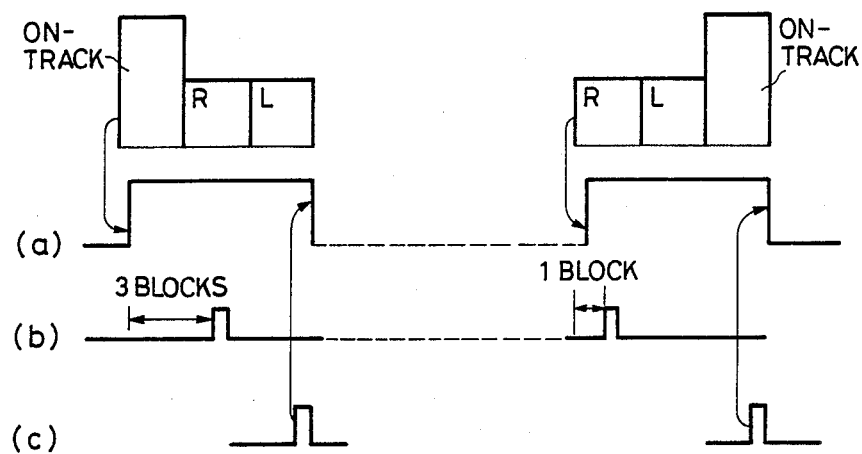
FIG. 15, consisting of (a)–(c), is a timing chart illustrating the waveforms of the individual portions depicted in FIG. 14.

FIGS. 15(a) through 15(c) are timing charts showing the waveforms of the individual portions of FIG. 14. The corresponding symbols are shown in FIG. 14.

Figure 16:
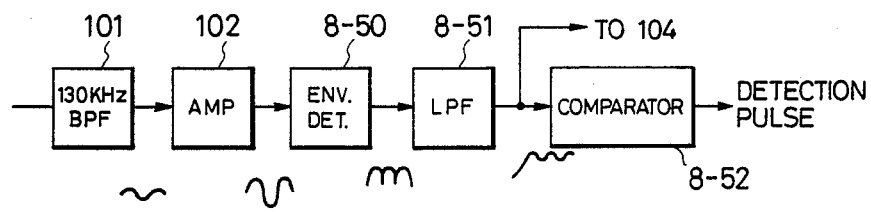
FIG. 16 is a block diagram showing a variant form of the 130 KHz detection circuit.

In the above described embodiment, 130 KHz is detected by means of the digital circuit. Such detection can, however, be carried out by the analog circuit the construction of which is schematically shown in FIG. 16. Namely, the outputs of the amplifier 102 are detected by the envelope detector (ENV.DET.) 8-50. The noise component of such outputs is eliminated by an LPF 8-51 and then undergoes a level-comparison in a comparator 8-52. If the output of the envelope detector 8-50 exceeds a predetermined level, this proves to be 130 KHz. The detection pulses are therefore output. It is to be noted that the output of the LPF 8-51 may be output to the S/H circuit 104.

As is obvious from the description given above, the present invention provides the following effects. Upon a detection of the pilot signals, the pilot signal component is sample and held after a specified period for which there exists true SYNC signals. As a consequence of this process, mistaken sampling caused by the pseudo SYNC signals is not carried out. The tracking is not subjected to any disturbances, because an erroneous quantity of track-deviation will not be supplied to the capstan servo. Stable tracking control can therefore be effected.

As many apparently widely different embodiments of this invention may be made without departing from the spirit and scope thereof, it is to be understood that the invention is not limited to the specific embodiments thereof set forth herein, as defined in the appended claims.

I claim:

1. In a rotary head type digital-audio reproducing system comprising means for reading a plurality of signals, including digital signals, tracking pilot signals ($f_1$) and SYNC signals ($f_2$, $f_3$) said plurality of signals being recorded on each of at least first, second and third adjacent, oblique tracks in a longitudinal direction on a recording medium, said tracking pilot signals and said SYNC signals being recorded, in each of a plurality of recording regions, at various predetermined locations along said tracks and in a predetermined pattern with respect to said recording regions, said recording regions being independent of each other with respect to the longitudinal direction, and said second adjacent rack being provided in between said first and third adjacent tracks, said means for reading including two rotary heads (A, B) each being provided for reading said plurality of signals, within a predetermined width, recorded on said recording medium, and providing an output including a reproduction of one of said adjacent tracks, said predetermined width being larger than a width of at least said second adjacent track, wherein the locations of the recording patterns of said pilot signals and said SYNC signals recorded on said first, second and third adjacent tracks differ from each other, cross talk of said pilot signals on said first and third tracks is present in said output of each of said rotary heads, and a servo means is provided for controlling each of said rotary heads to operate on-track track in response to a level of a difference of said cross talk of said pilot signals on said first and third adjacent tracks, the improvement comprising:

pilot signal detecting means for detecting a rise in said pilot signals from said output of a respective one of said rotary heads;

holding means for sampling and holding a level of said cross talk of said pilot signals on said first adjacent track in response to sampling signals; and means responsive to an output from said pilot signal detecting means for generating said sampling signals after a predetermined period has passed from detection of said rise in said pilot signals by said pilot signal detecting means.

wherein said servo means is controlled by generating a signal exhibiting a quantity of track-deviation from a track being read by one of said rotary heads, said track being read corresponding to said second track, said quantity of track-deviation corresponding to the level held by said holding means and a level of said cross talk of said pilot signals on said third adjacent track after an elapsed time which is measured from said sampling and becomes equal to said predetermined period.

2. A reproducing system according to claim 1, wherein said pilot signal detecting means includes a band pass filter (101) for transmitting only a predetermined frequency component of said output of each of said rotary heads.

3. A reproducing system according to claim 2, wherein said pilot signal detecting means further includes an envelope detector (103) for receiving said predetermined frequency component of said output of each of said rotary heads and detecting an envelope level thereof.

4. A reproducing system according to claim 3, wherein said output of each of said rotary heads comprises radio frequency signals.

5. A reproducing system according to claim 3, wherein said holding means includes a first sample and hold circuit (104) for sampling an envelope level of an output of said envelope detector by first sampling signals (SP1), a level being held by said first sample and hold circuit for sampling being equal to a DC level of cross talk of said pilot signals on said first adjacent track.

6. A reproducing system according to claim 5, wherein said first sampling signals are produced by a SYNC detection circuit (206).

7. A reproducing system according to claim 5, wherein said holding means further includes a differential amplifier (106) for receiving at one input thereof said envelope level output from said envelope detector and receiving at another input thereof an output of said first sample and hold circuit.

8. A reproducing system according to claim 7, wherein said holding means further includes a second sample and hold circuit (105) for sapling an output of said differential amplifier by second sampling signals (SP2).

9. A reproducing system according to claim 8, wherein said second sampling signals are supplied to said second sample and hold circuit and are generated by an ATF timing generation circuit (207).

10. A reproducing system according to claim 8, further comprising digital circuit means for generating said first and second sampling signals.

11. A reproducing system according to claim 10, wherein said digital circuit means includes a SYNC detection circuit for generating said first sampling signals, and an ATF timing generation circuit for generating said second sampling signals.

12. A reproducing system according to claim 10, wherein an output of said second sample and hold circuit is supplied to said servo means.

13. A reproducing system according to claim 10, wherein a SYNC detection circuit outputs the first sampling signals in response to detection of the beginning of each SYNC signal.

14. A reproducing system according to claim 13, wherein said output of each of said rotary heads includes analog radio frequency signals, and said digital circuit means further includes means for supplying said SYNC detection circuit with digitized radio frequency signals from said radio frequency signals received from said rotary heads, a crystal oscillator (2) for supplying said SYNC detection circuit with a fundamental clock signal ($f_M$), and means for generating an ATF window signal and supplying said window signal to said SYNC detection circuit, wherein said SYNC detection circuit further receives signals indicating which of said rotary heads is currently being used for reproduction of said radio frequency signals.

15. A reproducing system according to claim 13, wherein an ATF timing generation circuit receives detection pulse signals from said SYNC detection circuit, a number of said detection pulse signals exceeding a prescribed number during a given period equivalent to one-half block or one block, and said ATF timing generation circuit further receives said first sampling signals, wherein said digital circuit means further includes a crystal oscillator for supplying said ATF timing generation circuit with fundamental clock signals, and an ODD/$\overline{\text{EVEN}}$ generation circuit (218) for generating ODD/$\overline{\text{EVEN}}$ signals which are supplied to said ATF timing generation circuit.

16. A reproducing system according to claim 1, wherein said plurality of tracks includes a fourth track adjacent to said third track.

17. A reproducing system according to claim 1, wherein said width of each of said rotary heads is larger than a width of said first and third tracks.

18. A reproducing system according to claim 1, wherein said tracking pilot signals consist of signals having frequencies which yield fine azimuth effects.

19. A reproducing system according to claim 2, wherein said pilot signal detecting means further includes an amplifier for receiving said predetermined frequency component of said output of each of said rotary heads and amplifying said predetermined frequency component, and digital circuitry for receiving the amplified predetermined frequency component and detecting said pilot signals.

20. A reproducing system according to claim 2, wherein said pilot signal detecting means further includes an amplifier for receiving said predetermined frequency component of said output of each of said rotary heads and amplifying said predetermined frequency component, an envelope detector for receiving the amplified predetermined frequency component and detecting an envelope level thereof, and analog circuitry for receiving the envelope level and detecting said pilot signals.

21. A rotary head type digital-audio reproducing device for reading data recorded on a recording medium, said data including digital signals and tracking pilot signals and SYNC signals, said plurality of signals being recorded on each of at least first, second and third adjacent, oblique tracks in a longitudinal direction on a recording medium, said tracking pilot signals and said SYNC signals being recorded, in each of a plurality of recording regions, at various predetermined locations along said tracks and in a predetermined pattern with respect to said recording regions, said recording regions being independent of each other with respect to the longitudinal direction, said second adjacent track being provided in between said first and third adjacent tracks, said device comprising:

first and second rotary heads (1A, 1B) for reading said data, within a predetermined width, recorded on said recording medium and generating an output signal in the form of radio frequency signals including said data, said predetermined width being larger than a width of at least said second adjacent track;

means for generating fundamental clock signals;

means for generating a reference signal in response to said fundamental clock signals;

servo means for servo-controlling the relative movement of the recording medium and said first and second rotary heads in accordance with a quantity of track-deviation from a track being read by one of said rotary heads, said track being read corresponding to said second track;

an HSWP signal generator for generating HSWP signals;

means for changing between said first and second rotary heads in response to said HSWP signals; and a decode-data processing unit (11) for receiving said radio frequency signals and extracting desired data from said radio frequency signals, demodulating, deinterleaving and error correcting said desired data, said decode-data processing unit including a track deviation signal generator (11a) for generating an error signal indicative of said quantity of track-deviation, said error signal being applied to said servo means.

wherein said decode-data processing unit includes pilot signal detecting means for detecting rises in said pilot signals from said radio frequency signals output by said rotary heads, holding means for sampling and holding cross talk from said pilot signals on said first adjacent track in response to sampling signals and means responsive to an output from said pilot signal detecting means for generating said sampling signals after a predetermined period has passed from the detection of said pilot signals with said detecting means, and wherein said error signal indicative of said quantity of track-deviation corresponds to a level held by said holding means and a level of cross talk from said pilot signals on said third adjacent track until said predetermined period, measured from said sampling, elapses.

22. A reproducing device according to claim 21, further comprising a reproduction amplifier for amplifying said radio frequency signals from said rotary heads and feeding said amplified signals to said decode-data processing unit.

23. A reproducing device according to claim 21, wherein said width of each of said rotary heads is larger than a width of said first and third tracks.

* * * * *

UNITED STATES PATENT AND TRADEMARK OFFICE
CERTIFICATE OF CORRECTION

PATENT NO. : 4,943,873

DATED : July 24, 1990

INVENTOR(S) : Ken-ichiro Kawasaki

It is certified that error appears in the above-identified patent and that said Letters Patent is hereby corrected as shown below:

Cover Sheet, left hand column, bracket [73] entitled "Assignee" delete:

"Pioneer Electronic Corporation, Tokyo, Japan"

and insert:

--Pioneer Electronic Corporation, Tokyo, Japan, and Hitachi, Ltd., Tokyo, Japan --

Signed and Sealed this

Twenty-sixth Day of November, 1991

Attest:

HARRY F. MANBECK, JR.

*Attesting Officer*  *Commissioner of Patents and Trademarks*